United States Patent
Kim et al.

(10) Patent No.: US 12,522,562 B2
(45) Date of Patent: Jan. 13, 2026

(54) INTESTINE-SPECIFIC PARTIAL AGONISTS OF FARNESOID X RECEPTOR AND USES THEREOF

(71) Applicant: EWHA DrugDesignHouse Co., Ltd., Seoul (KR)

(72) Inventors: Dae-Kee Kim, Seoul (KR); Soyeon Shim, Seoul (KR)

(73) Assignee: EWHA DrugDesignHouse Co.,Ltd., Seoul (KR)

(*) Notice: Subject to any disclaimer, the term of this patent is extended or adjusted under 35 U.S.C. 154(b) by 429 days.

(21) Appl. No.: 18/213,985

(22) Filed: Jun. 26, 2023

(65) Prior Publication Data

US 2023/0416193 A1 Dec. 28, 2023

Related U.S. Application Data

(60) Provisional application No. 63/356,261, filed on Jun. 28, 2022.

(51) Int. Cl.
*C07C 255/60* (2006.01)
*A61P 1/16* (2006.01)

(52) U.S. Cl.
CPC .............. *C07C 255/60* (2013.01); *A61P 1/16* (2018.01)

(58) Field of Classification Search
None
See application file for complete search history.

(56) References Cited

U.S. PATENT DOCUMENTS

| | | |
|---|---|---|
| 2017/0066724 A1 | 3/2017 | Evans et al. |
| 2018/0244606 A1 | 8/2018 | Smith et al. |

FOREIGN PATENT DOCUMENTS

| | | |
|---|---|---|
| WO | 2004/046068 A2 | 6/2004 |
| WO | 2015/138969 A1 | 9/2015 |
| WO | 2016/149111 A1 | 9/2016 |
| WO | 2017/049172 A1 | 3/2017 |
| WO | 2020198537 A1 | 10/2020 |

OTHER PUBLICATIONS

Shim, S. et al., "Discovery of (E)-3-(3-((2-Cyano-4'-dimethylaminobiphenyl-4ylmethyl)cyclohexanecarbonylamino)-5-fluorophenyl)acrylic Acid Methyl Ester, an Intesting-Specific, FXR Partial Agonist for the Treatment of Nonalcoholic Steatohepatitis", Journal of Medicinal Chemistry, 2022, 65, 9974-10000.
PCT International Search Report dated Oct. 11, 2023, issued during the prosecution of PCT/KR2023/008982.
FXR (Makishima et al., Science 284 (5418):1362-1365 (1999).
Katafuchi et al., Int. J. Mol. Sci. 23:6046 (2022).
Chiang J. Lipid Res. 50 (10):1955-1966 (2009).
Schaap et al., Nat. Rev. Gastroenterol. Hepatol. 11 (1):55-67 (2014).
Hegade et al., Therap. Adv. Gastroenterol. 9 (3):376-391 (2016).
Zhu et al., Pharmacol. Res. 63 (4):259-265 (2011).
Uriarte et al., Gut 62 (6):899 (2013).
Goodwin et al., Mol. Cell 6 (3):517-526 (2000).
Gege et al., Handb. Exp. Pharmacol. 256:167-205 (2019).
Younossi, J. Hepatol. 70 (3):531-544 (2019).
Chalasani et al., Hepatology 67 (1):328-357 (2018).
Musso, et al., Nat. Rev. Drug Discov. 15 (4):249-274 (2016).
Wong et al., Hepatology 59 (6):2188-2195 (2014).
Charlton et al., Gastroenterology 141 (4):1249-1253 (2011).
Pellicciari et al., J. Med. Chem. 45 (17):3569-3572 (2002).
Neuschwander-Tetri et al., Lancet 385 (9972):956-965 (2015).
Maloney et al., J. Med. Chem. 43 (16): 2971-2974 (2000).
Akwabi-Ameyaw et al., Bioorg. Med. Chem. Lett. 18 (15):4339-4343 (2008).
Patel et al., Hepatology 72 (1):58-71 (2020).
Tully et al., J. Med. Chem. 60 (24):9960-9973 (2017).
Chianelli et al., J. Med. Chem. 63 (8):3868-3880 (2020).
Fang et al., Nat. Med. 21 (2):159-165 (2015).
Wagner et al., Hepatology 66 (S1):1049A (2017).
Harrison et al., J. Hepatol. 75 (1):25-33 (2021).
Modica et al., Gastroenterology 142 (2):355-365.e1-4 (2012).
Kong et al., Hepatology 56 (3):1034-1043 (2012).
Yu et al., Bioorg. Med. Chem. 22 (11):2919-2938 (2014).
Downes et al., Mol. Cell 11 (4):1079-1092 (2003).
Chen et al., J. Chem. Inf. Model. 60 (3):1540-1550 (2020).

*Primary Examiner* — Jeffrey S Lundgren
*Assistant Examiner* — Michael J Schmitt
(74) *Attorney, Agent, or Firm* — Troutman Pepper Locke LLP; Scott D. Wofsy

(57) ABSTRACT

An intestine-specific partial agonists of farnesoid X receptor (FXR) is disclosed, along with methods of making such compounds, pharmaceutical compositions and medicaments comprising such compounds, and methods of using such compounds in the treatment of conditions, diseases, or disorders associated with FXR activity.

6 Claims, 11 Drawing Sheets

R = H: CDCA
R = Et: Obeticholic acid
(OCA, 6-ECDCA)

GW4064

Cilofexor (GS-9674)

Tropifexor (LJN452)

Nidufexor (LMB763)

Fexaramine

MET409

INTESTINE-SPECIFIC PARTIAL AGONISTS OF FARNESOID X RECEPTOR AND USES THEREOF

FIELD OF THE INVENTION

The present invention relates to intestine-specific partial agonists of farnesoid X receptor (FXR), methods of making such compounds, pharmaceutical compositions and medicaments comprising such compounds, and methods of using such compounds in the treatment of conditions, diseases, or disorders associated with FXR activity.

BACKGROUND OF THE INVENTION

The farnesoid X receptor (FXR) is a metabolic nuclear receptor that is highly expressed in the liver, gall bladder, intestine, kidney, and adrenal glands. The primary bile acid chenodeoxycholic acid (CDCA) is the most potent endogenous ligand for FXR (Makishima et al., *Science* 284 (5418):1362-1365 (1999); Katafuchi et al., *Int. J. Mol. Sci.* 23:6046 (2022); Chiang *J. Lipid Res.* 50 (10):1955-1966 (2009)). In the ileum, FXR activation stimulates the transcription of fibroblast growth factor 19 (FGF19; rodent ortholog FGF15) which encodes an endocrine hormone that is secreted into the portal circulation. In the liver, FGF19 binds to fibroblast growth factor receptor 4 (FGFR4), which activates a signaling pathway involving Janus kinase and causes suppression of liver-specific cholesterol 7α-hydroxylase (CYP7A1), the rate-limiting enzyme for bile acid synthesis. FGF19 also lowers plasma triglyceride and glucose levels by both the suppression of key regulatory genes involved in the lipogenesis, triglyceride synthesis, and gluconeogenesis in the liver and the modulation of insulin sensitivity in peripheral tissues (Schaap et al., *Nat. Rev. Gastroenterol. Hepatol.* 11 (1):55-67 (2014); Hegade et al., *Therap. Adv. Gastroenterol.* 9 (3):376-391 (2016); Zhu et al., *Pharmacol. Res.* 63 (4):259-265 (2011); Uriarte et al., *Gut* 62 (6):899 (2013)). In the liver, bile acids bind to FXR, which transcriptionally upregulates transporters such as bile salt export pump (BSEP) and a protein called small heterodimer partner (SHP) that interferes with expression of CYP7A1 (Goodwin et al., *Mol. Cell* 6 (3):517-526 (2000)). Thus, FXR activation in the intestine and liver plays essential roles in the regulation of cholesterol and bile acid homeostasis, glucose metabolism, and insulin sensitivity.

FXR has emerged as a promising therapeutic target for several liver disorders such as primary biliary cirrhosis (PBC), primary sclerosing cholangitis (PSC), and nonalcoholic steatohepatitis (NASH), and many pharmaceutical companies are now trying to develop FXR modulators for these indications (Gege et al., *Handb. Exp. Pharmacol.* 256:167-205 (2019)) (FIG. 1).

NASH is characterized by the presence of liver steatosis, hepatic inflammation (steatohepatitis), hepatocyte injury (ballooning), and/or fibrosis, which can ultimately lead to cirrhosis and hepatocellular carcinoma (HCC) (Younossi, *J. Hepatol.* 70 (3):531-544 (2019); Chalasani et al., *Hepatology* 67 (1):328-357 (2018); Musso, et al., *Nat. Rev. Drug Discov.* 15 (4):249-274 (2016)). NASH has become a leading cause of cirrhosis and liver transplantation (Wong et al., *Hepatology* 59 (6):2188-2195 (2014); Charlton et al., *Gastroenterology* 141 (4):1249-1253 (2011)), and the prevalence of NASH is steadily increasing in parallel to the rising prevalence of obesity and type 2 diabetes. However, no effective drug therapy is currently available in patients with NASH.

The most advanced FXR agonist in clinical development for NASH is obeticholic acid (OCA, 6-ECDCA), a systemic full agonist (Pellicciari et al., *J. Med. Chem.* 45 (17):3569-3572 (2002)).

In the FLINT trial (Phase II trial) of OCA in patients with non-cirrhotic NASH, OCA treatment improved the composite nonalcoholic fatty liver disease activity score (NAS) and liver histology, while severe pruritus, an increase in total cholesterol and low-density lipoprotein (LDL) cholesterol, and a modest decrease in high-density lipoprotein (HDL) cholesterol were observed as possible therapy-limiting side effects (NCT01265498) (Neuschwander-Tetri et al., *Lancet* 385 (9972):956-965 (2015)). GW4064 is the first non-bile acid FXR full agonist with high potency and selectivity against other nuclear receptors. In a rodent model, GW4064 significantly lowered serum cholesterol and triglyceride levels, but failed to reach Phase I clinical trial because of its poor pharmacokinetic profiles and UV light instability attributed to a stilbene pharmacophore (Maloney et al., *J. Med. Chem.* 43 (16): 2971-2974 (2000); Akwabi-Ameyaw et al., *Bioorg. Med. Chem. Lett.* 18 (15):4339-4343 (2008)). Replacement of the photolabile stilbene moiety of GW4064 with a 2-(1-azetidinyl)pyridine moiety yielded a more stable and drug-like FXR agonist, cilofexor (GS-9674). In a phase II trial in patients with non-cirrhotic NASH, patients receiving cilofexor (100 mg) showed a median relative decrease in hepatic steatosis of –22.7%, compared with an increase of 1.9% in those receiving placebo, whereas significant changes in Enhanced Liver Fibrosis scores and liver stiffness were not observed. Moderate to severe pruritus was more common in patients receiving cilofexor (100 mg, 14%) than in those receiving placebo (4%) (NCT02854605) (Patel et al., *Hepatology* 72 (1):58-71 (2020)). A GW4064 derivative, tropifexor (LJN452) is an FXR full agonist with a single-digit nanomolar potency (Tully et al., *J. Med. Chem.* 60 (24):9960-9973 (2017)). In a Phase II clinical trial in patients with NASH, the interim results from the first two parts of the study showed that the effect of LJN452 on alanine aminotransferase (ALT), gamma-glutamyl transferase (GGT), and liver fat content (LFC) was more pronounced in the lower body mass index (BMI) subgroup compared with the higher BMI subgroup. Elevation of LDL cholesterol and a modest decrease in HDL cholesterol were observed in a higher dose group (90 μg) (NCT02855164). An FXR partial agonist, nidufexor (LMB763) exhibiting 57% maximum efficacy relative to GW4064 displayed potent and specific FXR-gene modulation, reducing steatosis, inflammation, and fibrosis in NASH rodent models (Chianelli et al., *J. Med. Chem.* 63 (8):3868-3880 (2020)). In a Phase II trial in patients with NASH, treatment with nidufexor reduced LFC by about 30% and ALT significantly. LDL cholesterol and triglyceride levels were not changed significantly, but HDL decreased in the nidufexor groups. Much higher rates of pruritus were experienced in the both high-dose group (54%) and low-dose group (30%) compared with the placebo group (15%) (NCT02913105). The results of this clinical trial suggest that an FXR partial agonist could elicit sufficient efficacies for the treatment of NASH, however, pruritus and adverse effects on serum lipid profiles seen in the FXR full agonists could not be avoided. Fexaramine is reported to be an intestine-selective FXR partial agonist. In diet-induced obesity mice, fexaramine demonstrated its pronounced metabolic improvements, reducing diet-induced weight gain, body-wide inflammation and hepatic glucose production, enhancing thermogenesis, and browning of white adipose tissue (Fang et al., *Nat. Med.* 21 (2):159-165 (2015)). A fexaramine-derived systemic FXR agonist, MET409 has sustained pharmacokinetic (PK) and pharmacodynamic (PD) properties with an $EC_{50}$ of 16 nM against human FXR (Wagner et al., *Hepatology* 66 (S1):1049A (2017)). In a Phase Ib proof-of-concept trial in patients with NASH, MET409 reduced LFC by 55% (80 mg) and 38% (50 mg) in comparison with 6% in placebo group. However, elevated LDL cholesterol and decreased HDL cholesterol levels were observed in the MET409-treated patients. With pruritus-related early discontinuations (10%), mild to moderate pruritus occurred in 16% (50 mg) and 40% (80 mg) of MET409-treated patients (Harrison et al., *J. Hepatol.* 75 (1):25-33 (2021)).

Although FXR agonists in clinical development have demonstrated very promising results in the treatment of NASH, their clinical utility has been limited by undesirable side effects such as pruritus and adverse effects on serum lipid profiles. It has been strongly suggested that FXR activation in the intestine only is sufficient to elicit the beneficial effects in NASH (Fang et al., *Nat. Med.* 21 (2):159-165 (2015); Modica et al., *Gastroenterology* 142 (2):355-365.e1-4 (2012); Kong et al., *Hepatology* 56 (3): 1034-1043 (2012)), therefore, it will be interesting to examine whether an intestine-selective/specific FXR agonist limits potentially undesirable side effects that come with liver FXR activation. In addition, since an FXR partial agonist, nidufexor displayed sufficient efficacies in patients with NASH (NCT02913105), it is another concern for inventors whether an intestine-selective/specific FXR partial agonist further limits FXR-related side effects. In order to develop an intestine-selective/specific FXR partial agonist, inventors have chosen fexaramine as the lead compound for structural modification because it is an intestine-selective FXR partial agonist, eliciting potent beneficial metabolic effects in diet-induced obesity mice.

SUMMARY OF THE INVENTION

Surprisingly, it has now been discovered that a compounds of Formula (I), or a pharmaceutically acceptable salt or a solvate thereof:

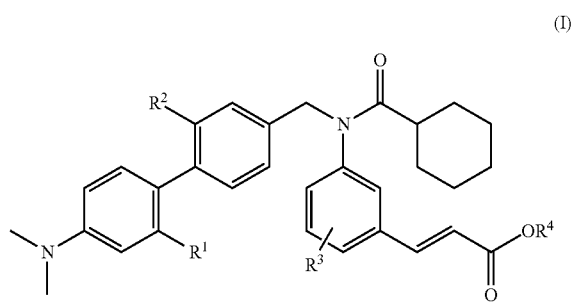

(I)

wherein $R^1$ is H, Me, F, Cl, or CN; $R^2$ is H, $CH_2OH$, $CH_2OMe$, [1,3]dioxolan-2-yl, or CN; $R^3$ is H or F; and $R^4$ is Me, Et, i-Pr, or cyclopropyl, is an intestine-specific FXR partial agonist, therefore, has utility in the treatment and prevention of various diseases states mediated by FXR, such as primary biliary cirrhosis (PBC), primary sclerosing cholangitis (PSC), cholestasis, nonalcoholic steatohepatitis (NASH), nonalcoholic fatty liver disease (NAFLD), necrotizing enterocolitis, gastritis, ulcerative colitis, Crohn's disease, inflammatory bowel disease, irritable bowel syndrome, gastroenteritis, radiation-induced enteritis, pseudomembranous colitis, chemotherapy-induced enteritis, gastro-esophageal reflux disease (GERD), non-ulcer dyspepsia (NUD), celiac disease, intestinal celiac disease, post-surgical inflammation, gastric carcinogenesis, or any combination thereof.

BRIEF DESCRIPTION OF THE DRAWINGS

The aforementioned aspects and other features of the present invention will be explained in the following description, taken in conjunction with the accompanying drawings, wherein:

FIG. 2A regards to intravenous injection of Example 11 at a dose of 5 mg/kg. Bars represent SD (n=5). FIG. 2B regards to oral administration of Example 11 at a dose of 80 mg/kg. Bars represent SD (n=4), FIG. 3A regards to blank plasma spiked with Example 11 (Ex. 11), Example 24 (Ex. 24), and Example 4 (Ex. 4) (internal standard). FIG. 3B regards to intravenous injection of Example 11 at a dose of 5 mg/kg. FIG. 3C regards to oral administration of Example 11 at a dose of 80 mg/kg.

DETAILED DESCRIPTION OF THE INVENTION

Figure 1A:
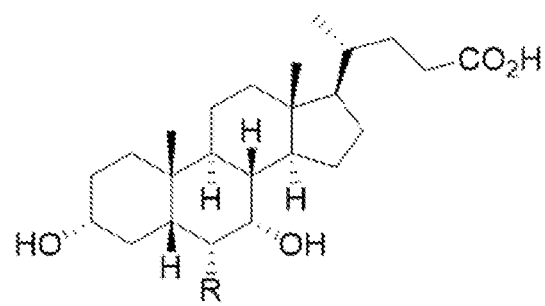
FIGS. 1A to 1G show representative FXR agonists.
Figure 1B:
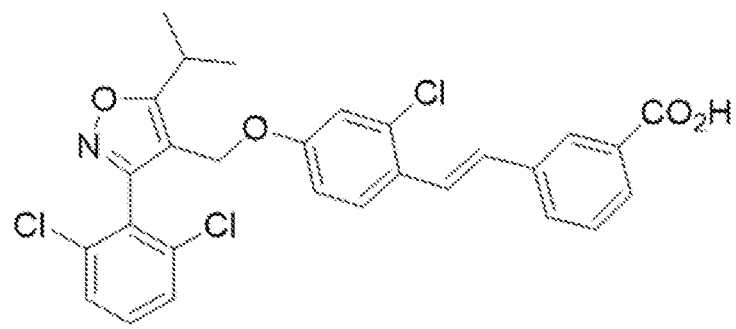
Figure 1C:
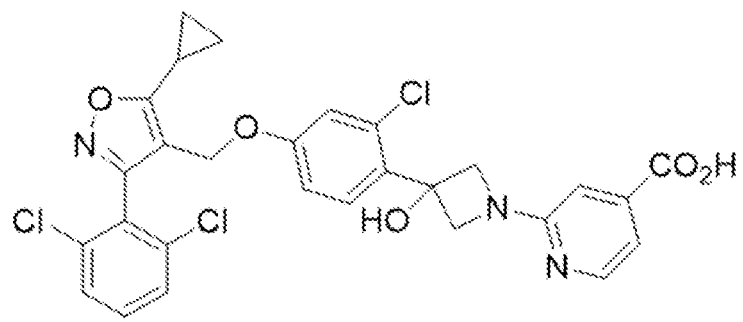
Figure 1D:
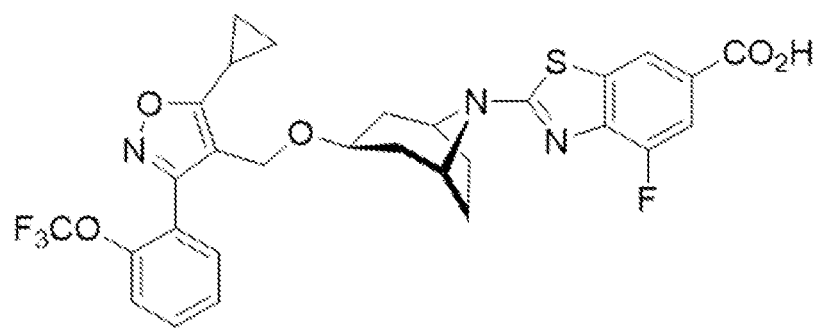
Figure 1E:
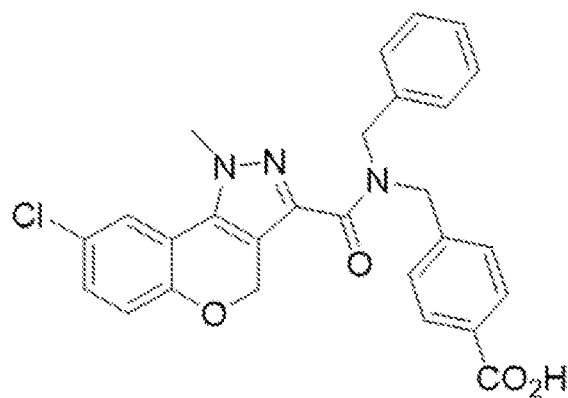
Figure 1F:
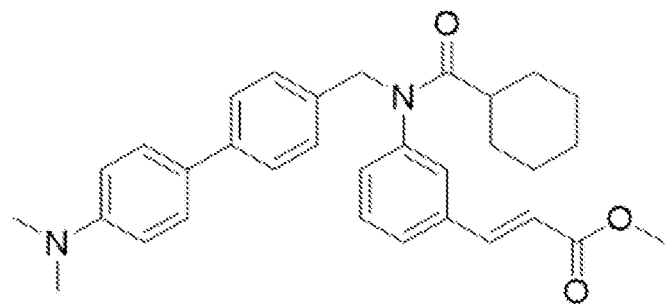
Figure 1G:
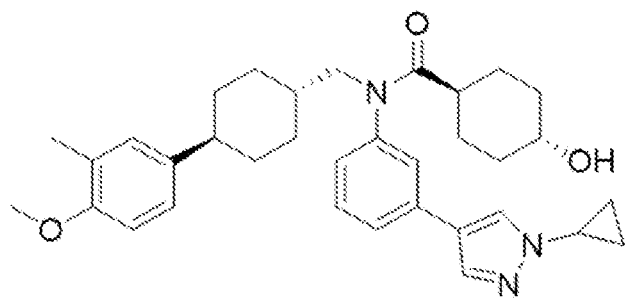

In an embodiment of the present invention, there is provided a compound of formula (I), or a pharmaceutically acceptable salt or a solvate thereof:

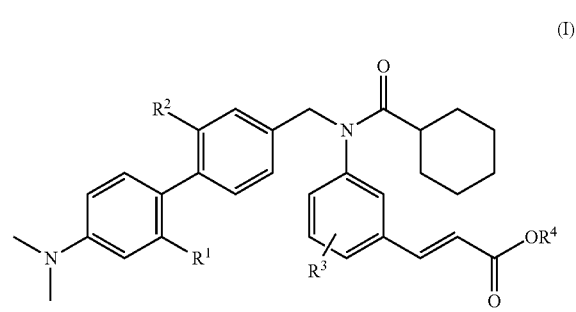

(I)

wherein $R^1$, $R^2$, $R^3$, and $R^4$ have been defined as above.

Specific compounds of the invention which may be mentioned include the following and pharmaceutically acceptable salts or solvates thereof:

(E)-3-(3-(cyclohexanecarbonyl-(4'-dimethylamino-2-hydroxymethylbiphenyl-4-ylmethyl)amino)phenyl)acrylic acid methyl ester;
(E)-3-(3-(cyclohexanecarbonyl-(4'-dimethylamino-2-methoxymethylbiphenyl-4-ylmethyl)amino)phenyl) acrylic acid methyl ester;
(E)-3-(3-(cyclohexanecarbonyl-(4'-dimethylamino-2-[1,3]dioxolan-2-ylbiphenyl-4-ylmethyl)amino)phenyl)acrylic acid methyl ester;
(E)-3-(3-((2-cyano-4'-dimethylaminobiphenyl-4-ylmethyl) cyclohexanecarbonylamino)phenyl)acrylic acid methyl ester;
(E)-3-(3-((2-cyano-4'-dimethylamino-2'-methylbiphenyl-4-ylmethyl)cyclohexanecarbonylamino)phenyl)acrylic acid methyl ester;
(E)-3-(3-((2-cyano-4'-dimethylamino-2'-fluorobiphenyl-4-ylmethyl)cyclohexane-carbonylamino)phenyl)acrylic acid methyl ester;
(E)-3-(3-((2'-chloro-2-cyano-4'-dimethylaminobiphenyl-4-ylmethyl)cyclohexane-carbonylamino)phenyl)acrylic acid methyl ester;
(E)-3-(3-(cyclohexanecarbonyl-(2,2'-dicyano-4'-dimethylaminobiphenyl-4-ylmethyl)-amino)phenyl)acrylic acid methyl ester;
(E)-3-(3-((2-cyano-4'-dimethylaminobiphenyl-4-ylmethyl) cyclohexanecarbonylamino)phenyl)acrylic acid ethyl ester;
(E)-3-(3-((2-cyano-4'-dimethylaminobiphenyl-4-ylmethyl) cyclohexanecarbonylamino)phenyl)acrylic acid isopropyl ester;
(E)-3-(3-((2-cyano-4'-dimethylaminobiphenyl-4-ylmethyl) cyclohexanecarbonylamino)-5-fluorophenyl)acrylic acid methyl ester;
(E)-3-(3-((2-cyano-4'-dimethylaminobiphenyl-4-ylmethyl) cyclohexanecarbonylamino)-5-fluorophenyl)acrylic acid ethyl ester;
(E)-3-(3-((2-cyano-4'-dimethylaminobiphenyl-4-ylmethyl) cyclohexanecarbonylamino)-5-fluorophenyl)acrylic acid isopropyl ester;
(E)-3-(5-((2-cyano-4'-dimethylaminobiphenyl-4-ylmethyl) cyclohexanecarbonylamino-2-fluorophenyl)acrylic acid methyl ester;
(E)-3-(5-((2-cyano-4'-dimethylaminobiphenyl-4-ylmethyl) cyclohexanecarbonylamino-2-fluorophenyl)acrylic acid ethyl ester;
(E)-3-(5-((2-cyano-4'-dimethylaminobiphenyl-4-ylmethyl) cyclohexanecarbonylamino-2-fluorophenyl)acrylic acid isopropyl ester;
(E)-3-(3-((2-cyano-4'-dimethylaminobiphenyl-4-ylmethyl) cyclohexanecarbonylamino)-2-fluorophenyl)acrylic acid methyl ester;
(E)-3-(3-((2-cyano-4'-dimethylaminobiphenyl-4-ylmethyl) cyclohexanecarbonylamino)-2-fluorophenyl)acrylic acid ethyl ester;
(E)-3-(3-((2-cyano-4'-dimethylaminobiphenyl-4-ylmethyl) cyclohexanecarbonylamino)-2-fluorophenyl)acrylic acid isopropyl ester;
(E)-3-(3-((2-cyano-4'-dimethylaminobiphenyl-4-ylmethyl) cyclohexanecarbonylamino)-4-fluorophenyl)acrylic acid methyl ester;
(E)-3-(3-((2-cyano-4'-dimethylaminobiphenyl-4-ylmethyl) cyclohexanecarbonylamino)-4-fluorophenyl)acrylic acid ethyl ester;
(E)-3-(3-((2-cyano-4'-dimethylaminobiphenyl-4-ylmethyl) cyclohexanecarbonylamino)-4-fluorophenyl)acrylic acid isopropyl ester; and
(E)-3-(3-((2-cyano-4'-dimethylaminobiphenyl-4-ylmethyl) cyclohexanecarbonylamino)phenyl)acrylic acid cyclopropyl ester.

A compound of Formula (I) can be treated with an acid to form acid addition salts. Examples of such acids include hydrochloric acid, hydrobromic acid, hydroiodic acid, sulfuric acid, methanesulfonic acid, phosphoric acid, p-bromophenylsulfonic acid, carbonic acid, succinic acid, citric acid, benzoic acid, oxalic acid, malonic acid, salicylic acid, malic acid, fumaric acid, ascorbic acid, maleic acid, acetic acid, and other mineral and organic acids well known to those skilled in the art. The acid addition salts can be prepared by treating a compound of Formula (I) in its free base form with a sufficient amount of an acid (e.g., hydrochloric acid) to produce an acid addition salt (e.g., a hydrochloride salt). The acid addition salt can be converted back to its free base form by treating the salt with a suitable dilute aqueous basic solution (e.g., sodium hydroxide, sodium bicarbonate, potassium carbonate, or ammonia).

Some of the compounds of this invention may be crystallized or recrystallized from solvents such as aqueous and organic solvents. In such cases solvates may be formed. This invention includes within its scope stoichiometric solvates including hydrates as well as compounds containing variable amounts of water that may be produced by processes such as lyophilization.

Compounds of Formula (I) may be prepared by a number of known methods from commercially available or known starting materials. If the starting materials are unavailable from a commercial source, they can be prepared by procedures known in the art.

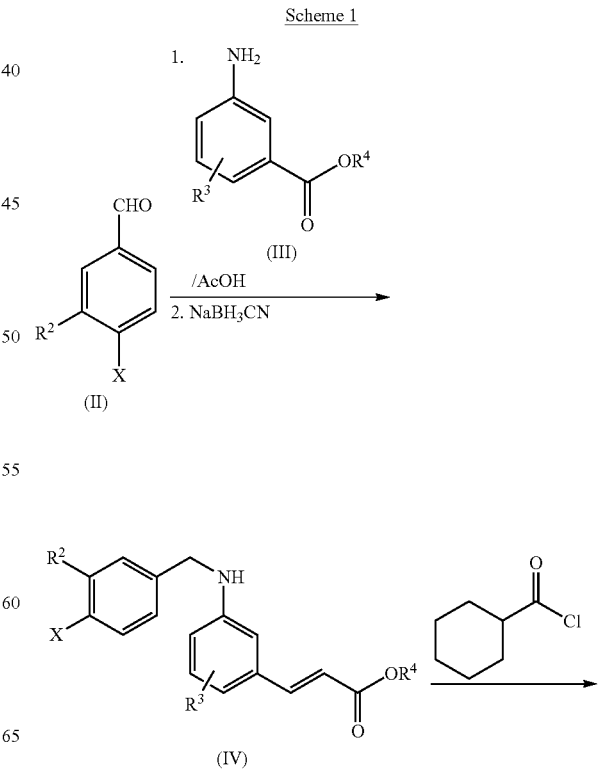

Scheme 1

-continued

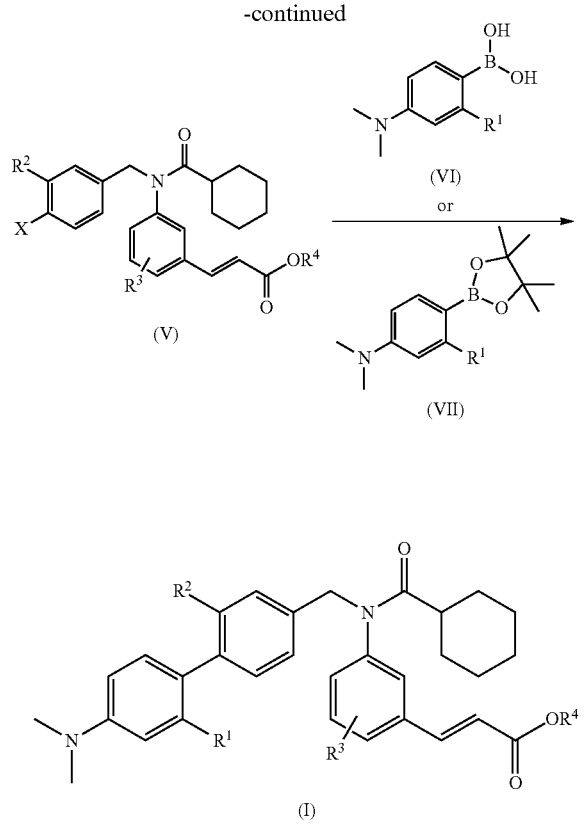

Scheme 2

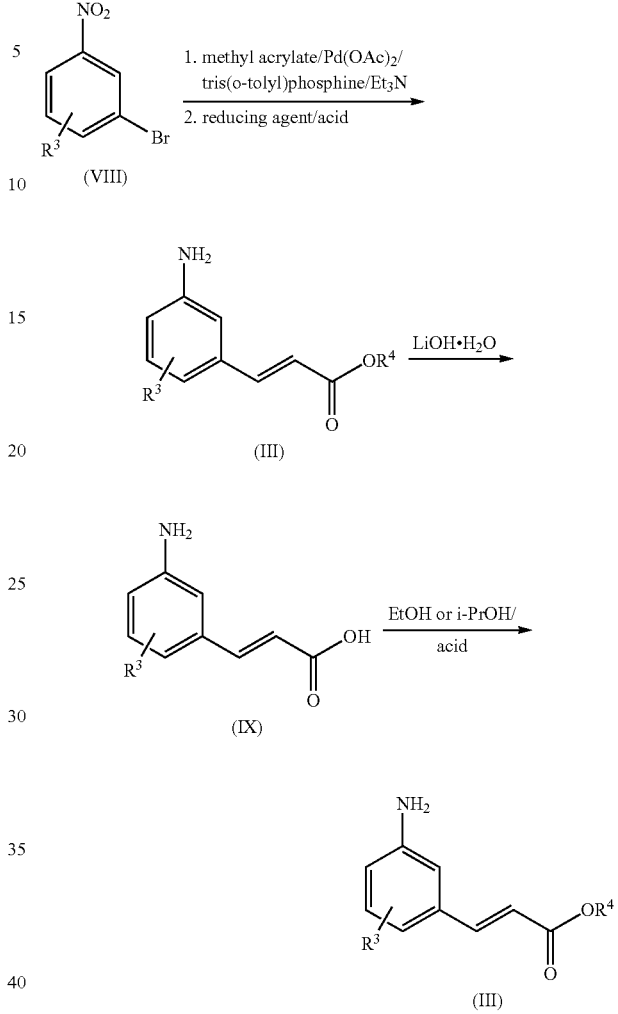

In one method, compounds of Formula (I) are prepared according to Scheme 1. Specifically, reductive amination of $R^2$-substituted 4-halobenzaldehyde (II) wherein X is Cl, Br, or I with an appropriate $R^3$- and/or $R^4$-substituted amine (III) in the presence of AcOH using $NaBH_3CN$ as reducing agent affords a secondary amine (IV). Acylation of the amine (IV) with cyclohexanecarbonyl chloride affords a tertiary amide (V). Suzuki cross-coupling reaction of the halo compound (V) with either an $R^1$-substituted 4-(dimethylamino)phenylboronic acid (VI) or an $R^1$-substituted N,N-dimethyl-4-(4,4,5,5-tetramethyl-1,3-dioxolan-2-yl)aniline (VII) in the presence of palladium catalyst such as $Pd(OAc)_2$, $Pd(PPh_3)_4$, $Pd_2(dba)_3$, $PdCl_2$, $Pd(PPh_3)_2Cl_2$, $(Pd(allyl)Cl)_2$, $PdCl_2(PPh_3)_2$, $PdCl_2(dppb)$, and $PdCl_2(dppf)$ yields a compound of Formula (I). $R^1$, $R^2$, $R^3$, and $R^4$ have been defined as above.

The requisite $R^3$- and/or $R^4$-substituted amines (III) are prepared according to Scheme 2. Coupling of $R^3$-substituted 1-bromo-3-nitrobenzene (VIII) with methyl acrylate in the presence of palladium catalyst and tris(o-tolyl)phosphine followed by reduction of nitro group with a reducing agent such as Fe powder and $SnCl_2$ in the presence of acid in $MeOH/H_2O$ affords an $R^3$- and/or $R^4$-substituted amine (III) wherein $R^3$ is H or F; and $R^4$ is Me. Hydrolysis of methyl acrylate functionality of amine (III) in the presence of LiOH gives the carboxylic acid (IX), which could be converted to an $R^3$- and/or $R^4$-substituted amine (III) wherein $R^3$ is H or F; and $R^4$ is Et or i-Pr by esterification with EtOH or i-PrOH in the presence of acid.

In another method, compounds of Formula (I) are prepared according to Scheme 3. Suzuki cross-coupling reaction of the halo compound (II) with either an $R^1$-substituted 4-(dimethylamino)phenylboronic acid (VI) or an $R^1$-substituted N,N-dimethyl-4-(4,4,5,5-tetramethyl-1,3-dioxolan-2-yl)aniline (VII) in the presence of palladium catalyst such as $Pd(OAc)_2$, $Pd(PPh_3)_4$, $Pd_2(dba)_3$, $PdCl_2$, $Pd(PPh_3)_2Cl_2$, $(Pd(allyl)Cl)_2$, $PdCl_2(PPh_3)_2$, $PdCl_2(dppb)$, and $PdCl_2(dppf)$ yields a compound of Formula (X). Reductive amination of $R^1$- and/or $R^2$-substituted aldehyde (X) with an appropriate $R^3$- and/or $R^4$-substituted amine (III) in the presence of AcOH using $NaBH_3CN$ as reducing agent affords a secondary amine (XI). Acylation of the amine (XI) with cyclohexanecarbonyl chloride affords a compound of Formula (I). $R^1$, $R^2$, $R^3$, $R^4$, and X have been defined as above.

Alternatively, compounds of Formula (I) possessing cyclopropyl acrylate functionality can be prepared according to Scheme 4. Hydrolysis of methyl acrylate functionality of compounds of Formula (I) in the presence of LiOH gives the carboxylic acid (XII), which could be converted to compounds of Formula (I) possessing cyclopropyl acrylate functionality by treatment with oxalyl chloride followed by cyclopropanol. $R^1$, $R^2$, and $R^3$ have been defined as above.

Scheme 3

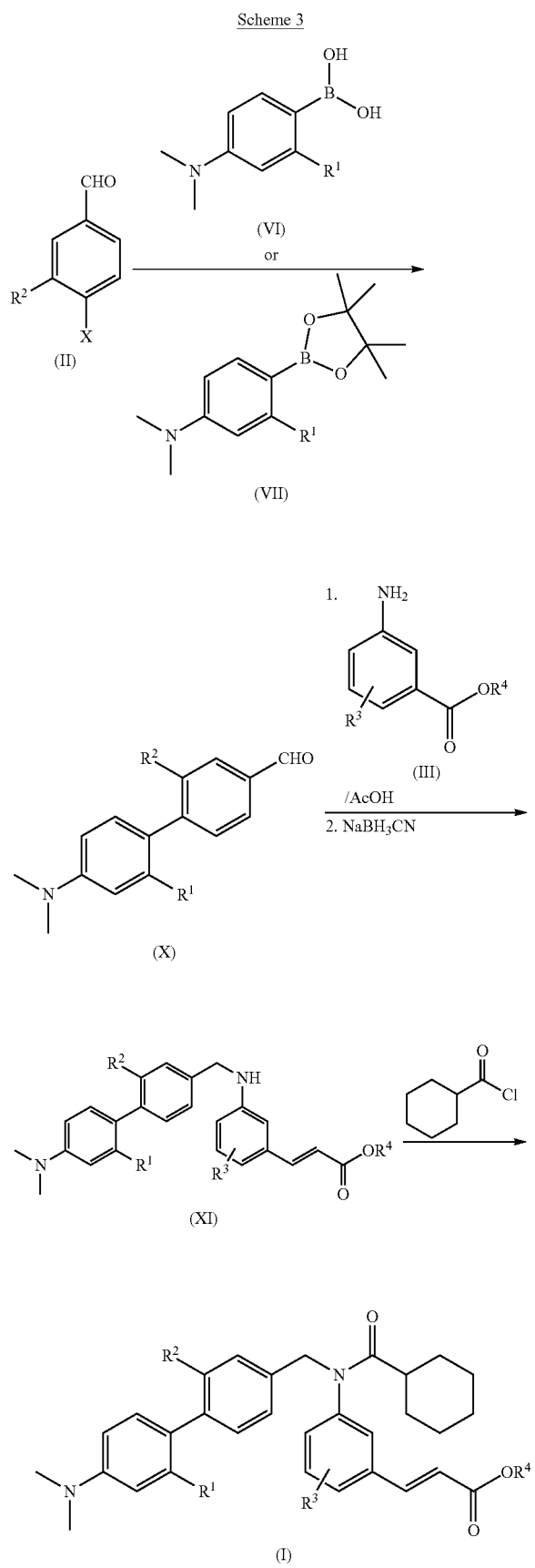

Scheme 4

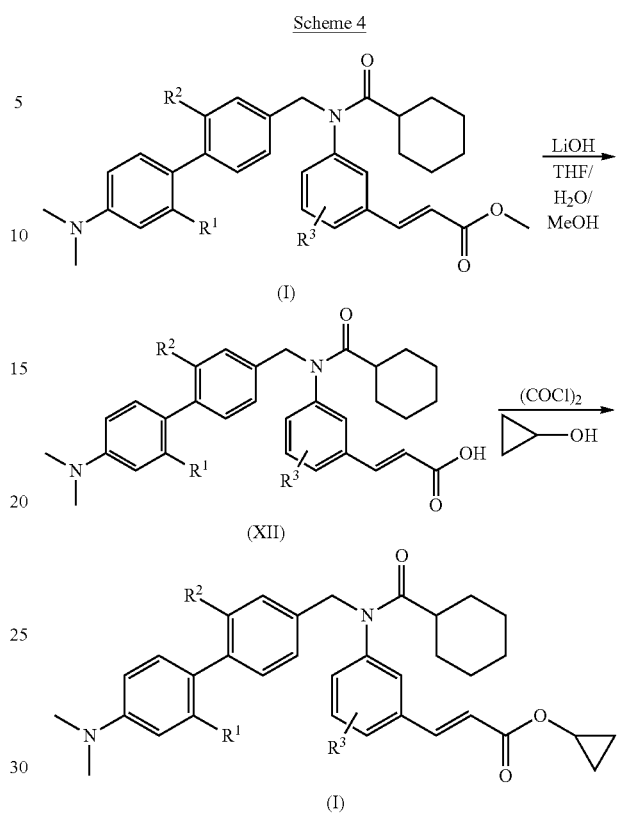

The resulting compounds of this invention represented by the Formula (I)-(XII) can be separated and purified by appropriate conventional methods such as column chromatography and recrystallization.

Compounds of the invention may be administered by oral, buccal, or sub-lingual administration. For administration to man in the curative or prophylactic treatment of the disorders identified above, oral, buccal or sub-lingual dosages of a compound of Formula (I) will generally be in the range of from 50-5000 mg daily for an average adult patient (70 kg). Thus, for a typical adult patient, individual tablets or capsules contain from 25-500 mg of active compound, in a suitable pharmaceutically acceptable vehicle or carrier, for administration in single or multiple doses, once or several times per day. In practice, the physician will determine the actual dosing regimen which will be most suitable for an individual patient and it will vary with the age, weight, and response of the particular patient. The above dosages are exemplary of the average case but there can be individual instances in which higher or lower dosage ranges may be merited, and such are within the scope of this invention.

For human use, a compound of Formula (I) can be administered alone, but will generally be administered in admixture with a pharmaceutical carrier selected with regard to the intended route of administration and standard pharmaceutical practice. For example, the compound may be administered orally, buccally or sublingually, in the form of tablets containing excipients such as starch or lactose, or in capsules or ovules either alone or in admixture with excipients, or in the form of elixirs or suspensions containing flavoring or coloring agents. Such liquid preparations may be prepared with pharmaceutically acceptable additives such as suspending agent (e.g. methylcellulose, a semi-synthetic glyceride such as witepsol or mixtures of glycerides such as a mixture of apricot kernel oil and PEG-6 esters or mixtures of PEG-8 and caprylic/capric glycerides). Thus, the invention provides in a further aspect a pharmaceutical composition comprising a compound of Formula (I), or a pharmaceutically acceptable salt or solvate thereof, together with a pharmaceutically acceptable diluent or carrier therefor.

The invention also provides a compound of Formula (I), or a pharmaceutically acceptable salt or solvate thereof, or a pharmaceutical composition containing either entity, for use in therapy.

The invention further provides the use of a compound of Formula (I), or a pharmaceutically acceptable salt or solvate thereof, or a pharmaceutical composition containing either entity, for the manufacture of a medicament for the treatment and prevention of various diseases states mediated by FXR in humans, such as primary biliary cirrhosis (PBC), primary sclerosing cholangitis (PSC), cholestasis, nonalcoholic steatohepatitis (NASH), nonalcoholic fatty liver disease (NAFLD), necrotizing enterocolitis, gastritis, ulcerative colitis, Crohn's disease, inflammatory bowel disease, irritable bowel syndrome, gastroenteritis, radiation-induced enteritis, pseudomembranous colitis, chemotherapy-induced enteritis, gastro-esophageal reflux disease (GERD), non-ulcer dyspepsia (NUD), celiac disease, intestinal celiac disease, post-surgical inflammation, gastric carcinogenesis, or any combination thereof.

The present invention is further illustrated in the following Examples, which should not be taken to limit the scope of the invention described in the claims.

EXAMPLES

Preparative Example 1

General Procedure for Preparation of (E)-3-(3-amino-5-fluorophenyl)acrylic Acid Methyl Ester (a Compound of the Formula (III) Wherein $R^3$=5-F, $R^4$=Me)

A stirred solution of 1-bromo-3-fluoro-5-nitrobenzene (7.45 g, 33.86 mmol), methyl acrylate (8.75 g, 101.64 mmol, 9.17 mL), and $Et_3N$ (10.28 g, 101.59 mmol, 14.16 mL) in anhydrous DMF (40 mL) was degassed by using vacuum pump and charged with $N_2$ by constant stirring at room temperature for 3 times. To it, $Pd(OAc)_2$ (0.15 g, 0.67 mmol) and tris(o-tolyl)phosphine (0.41 g, 1.35 mmol) were added. The mixture was heated to 80° C. overnight, cooled to room temperature, and poured into $H_2O$ (300 mL). The resulting solid was filtered, washed with $H_2O$ (3×200 mL), and dissolved in $CH_2Cl_2$ (300 mL). The $CH_2Cl_2$ solution was washed with brine (150 mL), dried over anhydrous $MgSO_4$, filtered, and evaporated to dryness under reduced pressure to afford 7.625 g of (E)-3-(3-fluoro-5-nitrophenyl)acrylic acid methyl ester as a light yellow solid. The crude product was used for next step without further purification. To a stirred mixture of (E)-3-(3-fluoro-5-nitrophenyl)acrylic acid methyl ester (7.625 g, 33.86 mmol) and iron powder (7.57 g, 135.54 mmol) in MeOH (112 mL) and water (28 mL) was added conc. HCl (1.23 mL) at room temperature in a dropwise manner. The mixture was heated to reflux overnight, cooled to room temperature, filtered through a Celite pad, and washed with MeOH. The combined filtered solution and washings was evaporated to dryness under reduced pressure, and the residue was diluted with $H_2O$ (30 mL) and extracted with EtOAc (3×30 mL). The combined EtOAc solution was washed with brine (30 mL), dried over anhydrous $Na_2SO_4$, filtered, and evaporated to dryness under reduced pressure to afford 4.65 g of the titled compound as a light yellow solid. Yield 70%. $^1$H NMR (400 MHz, $CDCl_3$) δ 3.80 (s, 3H), 3.86 (br s, 2H), 6.36 (d, 1H, J=15.8 Hz), 6.40 (dt, 1H, J=10.4, 1.8 Hz), 6.57 (t, 1H, J 1.6 Hz), 6.62 (dt, 1H, J=9.6, 1.8 Hz), 7.53 (d, 1H, 15.8 Hz).

Preparative Example 2

General Procedure for Preparation of (E)-3-(3-amino-5-fluorophenyl)acrylic Acid Ethyl Ester (a Compound of the Formula (III) Wherein $R^3$=5-F, $R^4$=Et)

To a stirred solution of (E)-3-(3-amino-5-fluorophenyl) acrylic acid methyl ester (3.00 g, 15.37 mmol) in THF/$H_2O$/MeOH (4:2:1, 105 mL) was added LiOH $H_2O$ (1.29 g, 30.74 mmol) at room temperature. The mixture was stirred at room temperature for 12 h and then concentrated under reduced pressure. The residue was dissolved in $H_2O$ (150 mL), and the pH of the solution was adjusted to 5-6 with 1 N HCl. The aqueous solution was extracted with EtOAc (2×150 mL), and the combined EtOAc solution was washed with brine (100 mL), dried over anhydrous $Na_2SO_4$, filtered, and evaporated to dryness under reduced pressure to afford 1.99 g of (E)-3-(3-amino-5-fluorophenyl)acrylic acid (a compound of the Formula (IX) wherein $R^3$=5-F) as a light yellow solid. The crude product was used for next step without further purification.

Yield 71%. $^1$H NMR (400 MHz, $CD_3OD$) δ 6.38 (d, 1H, J=15.8 Hz), 6.43 (m, 1H), 6.58 (m, 1H), 6.68 (m, 1H), 7.50 (d, 1H, J=15.8 Hz). $^{13}$C NMR (100 MHz, $CD_3OD$) δ 103.7 (d, J=23.2 Hz), 104.0 (d, J=25.5 Hz), 111.5 (d, J=2.3 Hz), 120.0, 138.2 (d, J=10.1 Hz), 145.9 (d, J=3.0 Hz), 151.9 (d, J=11.6 Hz), 165.5 (d, J=239.9 Hz), 170.2. IR ($CHCl_3$) 2917, 1737, 1464, 912, 740 cm 1. HRMS-ESI m/z [M+H]$^+$ calcd for $C_9H_9FNO_2$ 182.0612, found 182.0610.

To a stirred solution of (E)-3-(3-amino-5-fluorophenyl) acrylic acid (0.30 g, 1.66 mmol) in EtOH (15 mL) was added conc. $H_2SO_4$ (0.265 mL, 4.97 mmol) at room temperature using pressure bottle, and the mixture was heated to 80° C. overnight. After cooled to room temperature, to it, $Et_3N$ (1.62 mL, 11.59 mmol) was added to neutralize the reaction mixture. The reaction mixture was evaporated under reduced pressure, and the residue was purified by MPLC on silica gel using EtOAc/hexane (1:4) as eluent to afford 0.31 g of the titled compound as a light yellow solid. Yield 89%. $^1$H NMR (400 MHz, $CDCl_3$) δ 1.33 (t, 3H, J=7.2 Hz), 3.83 (br s, 2H), 4.26 (q, 2H, J=7.2 Hz), 6.35 (d, 1H, J=16.0 Hz), 6.39 (m, 1H), 6.57 (m, 1H), 6.62 (m, 1H), 7.52 (d, 1H, J=16.0 Hz). $^{13}$C NMR (100 MHz, $CDCl_3$) δ 14.5, 60.8, 103.8 (d, J=25.5 Hz), 104.5 (d, J=22.4 Hz), 110.7 (d, J=2.4 Hz), 119.5, 137.3 (d, J=10.0 Hz), 143.9 (d, J=2.4 Hz), 148.6 (d, J=11.6 Hz), 164.2 (d, J=242.2 Hz), 167.0. IR ($CHCl_3$) 3459, 2916, 1707, 1641, 1308, 1293, 1189, 841 cm$^{-1}$. HRMS-ESI m/z [M+H]$^+$ calcd for $C_{11}H_{13}FNO_2$ 210.0925, found 210.0929.

Preparative Example 3

Preparation of (E)-3-(3-amino-2-fluorophenyl) acrylic Acid Methyl Ester (a Compound of the Formula (III) Wherein $R^3$=2-F, $R^4$=Me)

The titled compound was prepared as described in Preparative Example 1 by using 1-bromo-2-fluoro-3-nitrobenzene in place of 1-bromo-3-fluoro-5-nitrobenzene. Yield 40% (a yellow solid). $^1$H NMR (400 MHz, CDCl$_3$) δ 3.79 (br s, 2H), 3.81 (s, 3H), 6.50 (d, 1H, J=16.4 Hz), 6.77-6.82 (m, 1H), 6.87-6.96 (m, 2H), 7.80 (d, 1H, J=16.4 Hz). $^{13}$C NMR (100 MHz, CDCl$_3$) δ 52.0, 118.1 (d, J=2.3 Hz), 118.6 (d, J=4.6 Hz), 120.4 (J=6.2 Hz), 122.6 (d, J=10.0 Hz), 124.6 (d, J=3.8 Hz), 135.3 (d, J=12.3 Hz), 138.0 (d, J=3.8 Hz), 150.5 (d, J=245.3 Hz), 167.6. HRMS-ESI m/z [M+H]$^+$ calcd for C$_{10}$H$_{11}$FNO$_2$ 196.0768, found 196.0766.

Preparative Example 4

Preparation of (E)-3-(3-amino-2-fluorophenyl) acrylic Acid Isopropyl Ester (a Compound of the Formula (III) Wherein R$^3$=2-F, R$^4$=iPr)

(E)-3-(3-Amino-2-fluorophenyl)acrylic acid (a compound of the Formula (IX) wherein R$^3$=2-F) was prepared as described in Preparative Example 2 by using (E)-3-(3-amino-2-fluorophenyl)acrylic acid methyl ester in place of (E)-3-(3-amino-5-fluorophenyl)acrylic acid methyl ester. Yield 90% (a white solid). $^1$H NMR (400 MHz, CD$_3$OD) δ 6.49 (d, 1H, J=16.0 Hz), 6.84-6.96 (m, 3H), 7.77 (d, 1H, J=16.0 Hz). $^{13}$C NMR (100 MHz, CD$_3$OD) δ 117.8 (d, J=1.6 Hz), 119.8 (d, J=4.7 Hz), 121.3 (d, J=6.2 Hz), 123.3 (d, J=9.2 Hz), 125.6 (d, J=3.9 Hz), 137.6 (d, J=13.2 Hz), 139.2 (d, J=4.7 Hz), 151.6 (d, J=243.8 Hz), 170.3. HRMS-ESI m/z [M+H]$^+$ calcd for C$_9$H$_9$FNO$_2$ 182.0612, found 182.0615.

The titled compound was prepared as described in Preparative Example 2 by reacting (E)-3-(3-amino-2-fluorophenyl)acrylic acid in i-PrOH instead of EtOH. Yield 83% (an oil). $^1$H NMR (400 MHz, CDCl$_3$) δ 1.32 (d, 6H, J=6.4 Hz), 3.78 (br s, 2H), 5.14 (sep, 1H, J=6.4 Hz), 6.48 (d, 1H, J=16.2 Hz), 6.76-6.81 (m, 1H), 6.87-6.96 (m, 2H), 7.77 (d, 1H, J=16.2 Hz). $^{13}$C NMR (100 MHz, CDCl$_3$) δ 22.2 (2 C), 68.1, 118.1 (d, J=2.3 Hz), 118.4 (d, J=3.8 Hz), 121.4 (d, J=6.2 Hz), 122.8 (d, J=10.0 Hz), 124.5 (d, J=4.6 Hz), 135.3 (d, J=13.2 Hz), 137.5 (d, J=3.8 Hz), 150.4 (d, J=245.3 Hz), 166.7. HRMS-ESI m/z [M+H]$^+$ calcd for C$_{12}$H$_{15}$FNO$_2$ 224.1081, found 224.1077.

Preparative Example 5

Preparation of (E)-3-(3-(3-cyano-4-iodobenzylamino)phenyl)acrylic Acid Methyl Ester (a Compound of the Formula (IV) Wherein R$^2$=CN, R$^3$=H, R$^4$=Me, X=I)

To a stirred solution of 5-formyl-2-iodobenzonitrile (0.50 g, 1.95 mmol) and (E)-3-(3-aminophenyl)acrylate (0.34 g, 1.95 mmol) in THF (15 mL) was added AcOH (0.11 mL, 1.95 mmol), and the mixture was heated to reflux for 12 h under N$_2$ atmosphere. After cooled to room temperature, to it, MeOH (5 mL) and NaBH$_3$CN (0.18 g, 2.93 mmol) were added. The reaction mixture was stirred for an additional 1 h at room temperature and quenched with saturated aqueous NH$_4$Cl solution (20 mL). The aqueous mixture was extracted with CH$_2$Cl$_2$ (2×50 mL), and the combined CH$_2$Cl$_2$ solution was dried over anhydrous Na$_2$SO$_4$, filtered, and evaporated to dryness under reduced pressure. The residue was purified by MPLC on silica gel using EtOAc/hexane (1:4) as eluent to afford 0.71 g of the titled compound as a light yellow solid. Yield 87%. $^1$H NMR (400 MHz, CDCl$_3$) δ 3.80 (s, 3H), 4.30 (br s, 1H), 4.37 (s, 2H), 6.35 (d, 1H, J=16.0 Hz), 6.57-6.60 (m, 1H), 6.67 (t, 1H, J=2.0 Hz), 6.93 (d, 1H, J=7.6 Hz), 7.18 (t, 1H, J=7.6 Hz), 7.23 (dd, 1H, J=8.0, 2.0 Hz), 7.58 (d, 1H, J=16.0 Hz), 7.62 (d, 1H, J=2.0 Hz), 7.88 (d, 1H, J=8.0 Hz). IR (CHCl$_3$) 3396, 2948, 2230, 1705, 1638, 1603, 1173 cmi. HRMS-ESI m/z [M+H]$^+$ calcd for C$_{18}$H$_{16}$IN$_2$O$_2$ 419.0251, found 419.0253.

Preparative Example 6

Preparation of (E)-3-(3-((3-cyano-4-iodobenzyl) cyclohexanecarbonylamino)phenyl)acrylic Acid Methyl Ester (a Compound of the Formula (V) Wherein R$^2$=CN, R$^3$=H, R$^4$=Me, X=I)

To a stirred solution of (E)-3-(3-(3-cyano-4-iodobenzylamino)phenyl)acrylic acid methyl ester (0.70 g, 1.67 mmol) in CH$_2$Cl$_2$ (10 mL) were added triethylamine (0.35 mL, 2.51 mmol) and 4-dimethylaminopyridine (0.02 g, 0.17 mmol) under N$_2$ atmosphere. After 30 min, to it, cyclohexanecarbonyl chloride (0.27 mL, 2.01 mmol) was added. The mixture was stirred at room temperature for 12 h, quenched with saturated aqueous NaHCO$_3$ solution (50 mL), and extracted with CH$_2$Cl$_2$ (2×50 mL). The combined CH$_2$Cl$_2$ solution was dried over anhydrous Na$_2$SO$_4$, filtered, and evaporated to dryness under reduced pressure. The residue was purified by MPLC on silica gel using EtOAc/hexane (1:4) as eluent to afford 0.72 g of the titled compound as a yellow foam. Yield 82%. $^1$H NMR (400 MHz, CDCl$_3$) δ 0.89-0.99 (m, 2H), 1.13-1.21 (m, 1H), 1.49-1.69 (m, 7H), 2.10-2.15 (m, 1H), 3.82 (s, 3H), 4.79 (s, 2H), 6.40 (d, 1H, J=16.0 Hz), 6.94-6.96 (m, 1H), 7.13 (t, 1H, J=2.0 Hz), 7.15 (dd, 1H, J=7.6, 2.0 Hz), 7.38-7.41 (m, 2H), 7.53 (d, 1H, J=7.6 Hz), 7.62 (d, 1H, J=16.0 Hz), 7.83 (d, 1H, J=8.4 Hz). IR (CHCl$_3$) 2930, 2854, 2230, 1717, 1642, 1599, 1198 cm$^{-1}$. HRMS-ESI m/z [M+H]$^+$ calcd for C$_{25}$H$_{26}$IN$_2$O$_2$ 529.0983, found 529.0985.

Preparative Example 7

Preparation of 4'-dimethylamino-4-formylbiphenyl-2-carbonitrile (a Compound of the Formula (X) Wherein R$^1$=H, R$^2$=CN)

To a stirred solution of 5-formyl-2-iodobenzonitrile (10.00 g, 38.91 mmol) and 4-(dimethylamino)phenylboronic acid hydrochloride (10.19 g, 50.58 mmol) in a mixture of 1,4-dioxane (320 mL) and H$_2$O (80 mL) was added K$_3$PO$_4$ (24.78 g, 116.73 mmol), and the mixture was degassed by using vacuum pump and charged with N$_2$ by constant stirring at room temperature for 3 times. To it, Pd$_2$(dba)$_3$ (0.89 g, 0.97 mmol) and SPhos (1.20 g, 2.92 mmol) were added. The mixture was heated to 100° C. overnight, cooled to room temperature, diluted with CH$_2$Cl$_2$ (500 mL), and filtered through a paper filter. Water (300 mL) was added to the filtered solution, and the organic layer was separated, washed with brine (300 mL), dried over anhydrous MgSO$_4$, filtered, and concentrated to ~300 mL under reduced pressure. The resulting yellow solid was filtered to afford 4.91 g of the titled compound as a yellow solid. The filtrate was evaporated to dryness under reduced pressure, and the residue was triturated with EtOAc (30 mL). The resulting yellow solid was filtered and washed with a mixture of EtOAc and hexane (1:4) to afford additional 3.69 g of the titled compound. Yield 88%. $^1$H NMR (400 MHz, CDCl$_3$) δ 3.06 (s, 6H), 6.79-6.84 (m, 2H), 7.54-7.59 (m, 2H), 7.67 (d, 1H, J=8.4 Hz), 8.06 (dd, 1H, J=8.4, 1.6 Hz), 8.20 (d, 1H, J=1.6 Hz), 10.02 (s, 1H). $^{13}$C NMR (100 MHz, CDCl$_3$) δ 40.4 (2 C), 111.2, 112.3, 118.7, 124.1, 130.1, 130.3, 132.8, 134.2, 136.2, 151.2, 151.5, 190.0. IR (CHCl$_3$) 2914, 2221, 1702, 1599, 1219, 800 cm$^{-1}$. HRMS-ESI m/z [M+H]$^+$ calcd for C$_{16}$H$_{15}$N$_2$O 251.1179, found 251.1174.

Preparative Example 8

Preparation of (E)-3-(3-((2-cyano-4'-dimethylamino-biphenyl-4-ylmethyl)amino)phenyl)acrylic Acid Isopropyl Ester (a Compound of the Formula (XI) Wherein R$^1$=H, R$^2$=CN, R$^3$=H, R$^4$=i-Pr)

A stirred mixture of 4'-dimethylamino-4-formylbiphenyl-2-carbonitrile (100 mg, 0.40 mmol), isopropyl (E)-3-(3-aminophenyl)acrylate (82 mg, 0.40 mmol), and AcOH (46 μL, 0.80 mmol) in 1,2-dichloroethane (10 mL) was heated at 100° C. for 5 h under N$_2$ atmosphere using a reverse dean-stark trap. The reaction mixture was cooled to room temperature, and to it, NaBH$_3$CN solution (0.8 mL, 1.0 M in THF, 0.80 mmol) was added. The resulting solution was stirred for 5 h at room temperature, diluted with CH$_2$Cl$_2$ to ~30 mL, and quenched with saturated aqueous NH$_4$Cl solution (5 mL). The separated organic layer was washed with H$_2$O (15 mL) and brine (15 mL), dried over anhydrous MgSO$_4$, filtered, and evaporated to dryness under reduced pressure. The solid residue was crystallized from EtOAc/hexane to give 137 mg of the titled compound as a light yellow solid. The filtrate was evaporated dryness under reduced pressure, and the residue was purified by MPLC on silica gel using EtOAc/hexane (3:7) as eluent to give 23 mg of an oily product, which was triturated with MeOH (0.5 mL) to afford an additional 18 mg of the titled compound. Yield 89%. $^1$H NMR (400 MHz, CDCl$_3$) δ 1.31 (d, 6H, J=6.4 Hz), 3.02 (s, 6H), 4.22 (t, 1H, 5.2 Hz), 4.41 (d, 2H, J=5.2 Hz), 5.13 (sep, 1H, J=6.4 Hz), 6.35 (d, 1H, J=15.8 Hz), 6.64 (m, 1H), 6.75 (pseudo t, 1H, J=1.8 Hz), 6.80 (m, 2H), 6.93 (br d, 1H, J=7.8 Hz), 7.19 (t, 1H, J=7.8 Hz), 7.46-7.51 (m, 3H), 7.58 (dd, 1H, J=8.0, 1.8 Hz), 7.58 (d, 1H, J=15.8 Hz), 7.70 (d, 1H, J=1.8 Hz). $^{13}$C NMR (100 MHz, CDCl$_3$) δ 22.2 (2 C), 40.5 (2 C), 47.3, 68.0, 110.9, 112.2, 112.4 (2 C), 115.1, 118.1, 118.9, 119.6, 125.5, 129.7 (2 C), 130.0, 130.2, 131.8, 132.5, 135.8, 137.9, 144.9, 145.0, 148.1, 150.8, 166.8. IR (CHCl$_3$) 2917, 2223, 1703, 1606, 1489, 908, 733 cm$^{-1}$. HRMS-ESI m/z [M+H]$^+$ calcd for C$_{28}$H$_{29}$N$_3$NaO$_2$ 462.2152, found 462.2155.

Preparative Example 9

Preparation of (E)-3-(3-((2-cyano-4'-dimethylamino-biphenyl-4-ylmethyl)amino)-5-fluorophenyl)acrylic Acid Methyl Ester (a Compound of the Formula (XI) Wherein R$^1$=H, R$^2$=CN, R$^3$=5-F, R$^4$=Me)

The titled compound was prepared as described in Preparative Example 8 by using (E)-3-(3-amino-5-fluorophenyl)acrylic acid methyl ester in place of isopropyl (E)-3-(3-aminophenyl)acrylate. Yield 100% (a light yellow solid). $^1$H NMR (400 MHz, CDCl$_3$) δ 3.02 (s, 6H), 3.80 (s, 3H), 4.39 (br s, 3H), 6.32 (m, 1H), 6.35 (d, 1H, J=15.8 Hz), 6.51 (m, 1H), 6.62 (m, 1H), 6.81 (m, 2H), 7.46-7.50 (m, 3H), 7.54 (d, 1H, J=15.8 Hz), 7.55 (dd, 1H, J=8.2, 2.0 Hz), 7.68 (d, 1H, J=2.0 Hz). $^{13}$C NMR (100 MHz, CDCl$_3$) δ 40.5 (2 C), 47.2, 52.0, 101.5 (d, J=25.6 Hz), 103.7 (d, J=23.2 Hz), 109.1 (d, J=1.6 Hz), 111.0, 112.4 (2 C), 119.1, 119.5, 125.4, 129.7 (2 C), 130.2, 131.7, 132.4, 137.15 (d, J=9.3 Hz), 137.20, 144.4 (d, J=3.1 Hz), 145.2, 149.6 (d, J=10.8 Hz), 150.9, 164.4 (d, J=242.2 Hz), 167.4. IR (CHCl$_3$) 3384, 2222, 1708, 1612, 1490, 1174, 913, 744 cm 1. HRMS-ESI m/z [M+H]$^+$ calcd for C$_{26}$H$_{25}$FN$_3$O$_2$ 430.1925, found 430.1923.

Preparative Example 10

Preparation of (E)-3-(3-((2-cyano-4'-dimethylamino-biphenyl-4-ylmethyl)amino)-5-fluorophenyl)acrylic Acid Ethyl Ester (a Compound of the Formula (XI) Wherein R$^1$=H, R$^2$=CN, R$^3$=5-F, R$^4$=Et)

The titled compound was prepared as described in Preparative Example 8 by using (E)-3-(3-amino-5-fluorophenyl)acrylic acid ethyl ester in place of isopropyl (E)-3-(3-aminophenyl)acrylate. Yield 82% (a light yellow solid). $^1$H NMR (400 MHz, CDCl$_3$) δ 1.33 (t, 3H, J=7.2 Hz), 3.02 (s, 6H), 4.26 (q, 2H, J=7.2 Hz), 4.38 (br s, 3H), 6.32 (m, 1H), 6.34 (d, 1H, J=16.0 Hz), 6.52 (m, 1H), 6.62 (m, 1H), 6.80 (m, 2H), 7.47-7.50 (m, 3H), 7.53 (d, 1H, J=16.0 Hz), 7.53-7.57 (m, 1H, overlapped), 7.68 (d, 1H, J=2.0 Hz). $^{13}$C NMR (100 MHz, CDCl$_3$) δ 14.5, 40.6 (2 C), 47.2, 60.8, 101.5 (d, J=25.6 Hz), 103.7 (d, J=22.4 Hz), 109.1 (d, J=2.3 Hz), 111.1, 112.5 (2 C), 119.5, 119.6, 125.4, 129.8 (2 C), 130.3, 131.7, 132.4, 137.2, 137.3 (d, J=10.1 Hz), 144.1 (d, J=3.1 Hz), 145.2, 149.6 (d, J=11.6 Hz), 150.8, 164.4 (d, J=243.0 Hz), 167.0. IR (CHCl$_3$) 2916, 2222, 1709, 1611, 1489, 1182 cm$^{-1}$. HRMS-ESI m/z [M+H]$^+$ calcd for C$_{27}$H$_{27}$FN$_3$O$_2$ 444.2082, found 444.2087.

Preparative Example 11

Preparation of (E)-3-(3-((2-cyano-4'-dimethylamino-biphenyl-4-ylmethyl)amino)-2-fluorophenyl)acrylic Acid Isopropyl Ester (a Compound of the Formula (XI) Wherein R$^1$=H, R$^2$=CN, R$^3$=2-F, R$^4$=i-Pr)

The titled compound was prepared as described in Preparative Example 8 by using (E)-3-(3-amino-2-fluorophenyl)acrylic acid isopropyl ester in place of isopropyl (E)-3-(3-aminophenyl)acrylate. Yield 51% (a white solid). $^1$H NMR (400 MHz, CDCl$_3$) δ 1.32 (d, 6H, J=6.4 Hz), 3.02 (s, 6H), 4.44 (d, 1H, J=5.6 Hz), 4.53 (m, 1H), 5.15 (sep, 1H, J=6.4 Hz), 6.48 (d, 1H, J=16.2 Hz), 6.60 (td, 1H, J=8.0, 1.2 Hz), 6.80 (m, 2H), 6.88 (m, 1H), 6.96 (pseudo t, 1H, J=8.0 Hz), 7.45-7.50 (m, 3H), 7.58 (dd, 1H, J=8.4, 1.8 Hz), 7.70 (d, 1H, J=1.8 Hz), 7.82 (d, 1H, J=16.2 Hz). $^{13}$C NMR (100 MHz, CDCl$_3$) δ 22.2 (2 C), 40.6 (2 C), 47.0, 68.1, 111.0, 112.4 (2 C), 113.7 (d, J=3.8 Hz), 116.6 (d, J=2.3 Hz), 119.5, 121.4 (d, J=6.5 Hz), 122.2 (d, J=9.3 Hz), 124.7, 124.8, 129.7 (2 C), 130.2, 131.7, 132.5, 136.6 (d, J=11.6 Hz), 137.3 (d, J=4.6 Hz), 137.5, 145.1, 150.3 (d, J=245.3 Hz), 150.8, 166.7. IR (CHCl$_3$) 2921, 2851, 2223, 1705, 1636, 1612, 1490, 1197 cm$^{-1}$. HRMS-ESI m/z [M+H]$^+$ calcd for C$_{28}$H$_{29}$FN$_3$O$_2$ 458.2238, found 458.2241.

Practice Example 1

Preparation of (E)-3-(3-((2-cyano-4'-dimethylamino-biphenyl-4-ylmethyl)cyclohexanecarbonylamino) phenyl)acrylic Acid Methyl Ester (Example 4)

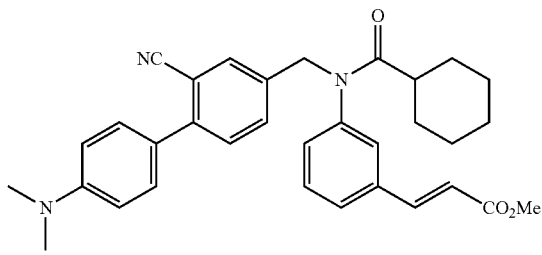 [SMILES: COC(=O)/C=C/c1cccc(N(Cc2ccc(-c3ccc(N(C)C)cc3)c(C#N)c2)C(=O)C2CCCCC2)c1]

A stirred mixture of (E)-3-(3-((3-cyano-4-iodobenzyl)cyclohexanecarbonylamino)phenyl)-acrylic acid methyl ester (0.20 g, 0.38 mmol), 4-(dimethylamino)phenylboronic acid (0.18 g, 1.14 mmol), CsF (0.17 g, 1.14 mmol), Pd(Ph$_3$)$_4$ (0.044 g, 0.038 mmol), and anhydrous 1,2-dimethoxyethane (10 mL) in an oven-dried sealed tube was heated at 90° C. for 36 h. After cooled to room temperature, the solvent was evaporated to dryness under reduced pressure. The residue was diluted with H$_2$O (20 mL) and extracted with CH$_2$Cl$_2$ (2×50 mL). The combined CH$_2$Cl$_2$ solution was dried over anhydrous Na$_2$SO$_4$, filtered, and evaporated to dryness under reduced pressure. The residue was purified by MPLC on silica gel using EtOAc/hexane (1:4) as eluent to give 0.08 g of the titled compound as a white solid. Yield 42%. $^1$H NMR (400 MHz, CDCl$_3$) δ 0.90-1.02 (m, 2H), 1.14-1.27 (m, 1H), 1.53-1.71 (m, 7H), 2.16 (m, 1H), 3.02 (s, 6H), 3.82 (s, 3H), 4.87 (s, 2H), 6.39 (d, 1H, J=16.0 Hz), 6.77-6.82 (m, 2H), 7.02 (br d, 1H, J=8.8 Hz), 7.16 (br s, 1H), 7.38-7.49 (m, 6H), 7.52 (br d, 1H, J=7.6 Hz), 7.64 (d, 1H, J=16.0 Hz). $^{13}$C NMR (100 MHz, CDCl$_3$) δ 25.6 (2 C), 25.7, 29.7 (2 C), 40.5 (2 C), 41.8, 52.1, 52.3, 110.5, 112.3 (2 C), 119.5, 119.6, 125.4, 127.72, 127.75, 129.8 (2 C), 130.0 (2 C), 130.6, 133.2, 133.8, 136.2, 136.4, 143.1, 143.5, 145.1, 150.8, 167.2, 176.5. IR (CHCl$_3$) 2928, 2854, 2223, 1717, 1646, 1611, 1489, 1200 cm 1. HRMS-ESI m/z [M+H]$^+$ calcd for C$_{33}$H$_{36}$N$_3$O$_3$ 522.2751, found 522.2749.

Practice Example 2

Preparation of (E)-3-(3-((2-cyano-4'-dimethylamino-2'-fluorobiphenyl-4-ylmethyl)cyclohexanecarbonylamino)phenyl)acrylic Acid Methyl Ester (Example 6)

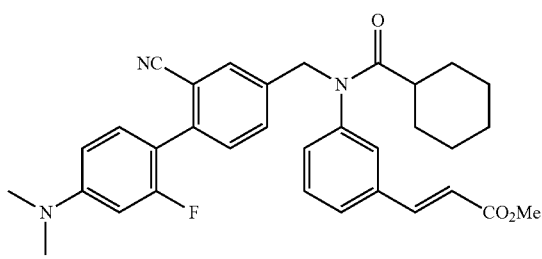 [SMILES: COC(=O)/C=C/c1cccc(N(Cc2ccc(-c3ccc(N(C)C)cc3F)c(C#N)c2)C(=O)C2CCCCC2)c1]

To a stirred solution of (E)-3-(3-((3-cyano-4-iodobenzyl)cyclohexanecarbonylamino)-phenyl)acrylic acid methyl ester (0.50 g, 0.95 mmol) and 3-fluoro-N,N-dimethyl-4-(4,4,5,5-tetramethyl-1,3,2-dioxaborolan-2-yl)aniline (0.31 g, 1.24 mmol) in 1,4-dioxane (30 mL) was added K$_3$PO$_4$ (0.40 g, 1.90 mmol), and the mixture was degassed with N$_2$ by constant stirring at room temperature for 2 h. A pre-catalyst was prepared from Pd$_2$(dba)$_3$ (22 mg, 0.02 mmol) and SPhos (29 mg, 0.07 mmol) in anhydrous THF (5 mL) in a single necked 10-mL round bottom flask by constant stirring and degassing with N$_2$ at room temperature for 2 h. A pre-catalyst solution was added to the above mixture through a cannula, to it, deionized H$_2$O (1 mL) degassed with N$_2$ for 10 min was added. The mixture was stirred at 100° C. for 14 h and then cooled to room temperature, filtered through a small pad of Celite, and washed with H$_2$O (30 mL). The filtered solution was extracted with CH$_2$Cl$_2$ (3×30 mL), and the CH$_2$Cl$_2$ solution was dried over anhydrous Na$_2$SO$_4$, filtered, and evaporated to dryness under reduced pressure. The residue was purified by MPLC on silica gel using EtOAc/hexane (3:7) as eluent to afford 0.42 g of the titled compound as a white solid. Yield 82%. $^1$H NMR (400 MHz, CDCl$_3$) δ 0.90-1.02 (m, 2H), 1.13-1.27 (m, 1H), 1.51-1.72 (m, 7H), 2.16 (m, 1H), 3.00 (s, 6H), 3.81 (s, 3H), 4.88 (s, 2H), 6.39 (d, 1H, J=16.2 Hz), 6.47 (dd, 1H, J=14.0, 2.4 Hz), 6.54 (dd, 1H, J=8.8, 2.4 Hz), 7.02 (br d, 1H, J=7.6 Hz), 7.16 (br s, 1H), 7.26 (t, 1H, J=8.8 Hz), 7.38-7.49 (m, 4H), 7.52 (br d, 1H, J=7.6 Hz), 7.64 (d, 1H, J=16.2 Hz). $^{13}$C NMR (100 MHz, CDCl$_3$) δ 25.6 (2 C), 25.7, 29.7 (2 C), 40.4 (2 C), 41.8, 52.0, 52.4, 99.3 (d, J=26.3 Hz), 108.1 (d, J=2.3 Hz), 112.5, 112.6, 118.7, 119.6, 127.7, 129.9, 130.5, 131.4, 131.5 (d, J=14.7 Hz), 131.7, 132.8, 133.2, 136.5, 137.1, 139.7, 143.2, 143.4, 152.6 (d, J=11.7 Hz), 160.7 (d, J=243.8 Hz), 167.1, 176.5. IR (CHCl$_3$) 2929, 2855, 2227, 1717, 1628, 1491, 1205, 755 cm$^{-1}$. HRMS-ESI m/z [M+H]$^+$ calcd for C$_{33}$H$_{35}$FN$_3$O$_3$ 540.2657, found 540.2658.

Practice Example 3

Preparation of (E)-3-(3-((2-cyano-4'-dimethylamino-biphenyl-4-ylmethyl)cyclohexanecarbonylamino)-5-fluorophenyl)acrylic Acid Methyl Ester (Example 11)

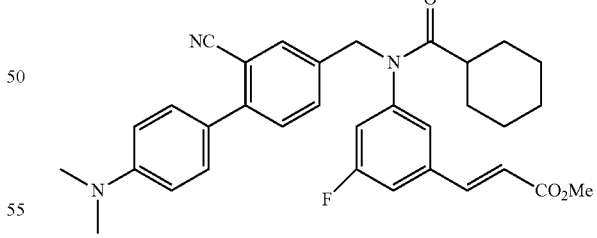

To a stirred suspension of (E)-3-(3-((2-cyano-4'-dimethylaminobiphenyl-4-ylmethyl)amino)-5-fluorophenyl)acrylic acid methyl ester (0.40 g, 0.93 mmol), Et$_3$N (0.39 mL, 2.79 mmol), and DMAP (11 mg, 0.09 mmol) in anhydrous CH$_2$Cl$_2$ (9 mL) was added cyclohexanecarbonyl chloride (0.25 mL, 1.86 mmol) at room temperature under N$_2$ atmosphere. The resulting mixture was stirred overnight, quenched with saturated aqueous NaHCO$_3$ solution (10 mL), vigorously stirred for an additional 10 min, and diluted with CH$_2$Cl$_2$ (40 mL). The separated CH$_2$Cl$_2$ solution was washed with H₂O (25 mL) and brine (25 mL), dried over anhydrous MgSO₄, filtered, and evaporated to dryness under reduced pressure. The residue was purified by MPLC on silica gel using EtOAc/hexane (3:7) as eluent to afford 0.39 g of the titled compound as a light yellow solid. Yield 77%. $^1$H NMR (400 MHz, CDCl₃) δ 0.94-1.06 (m, 2H), 1.16-1.27 (m, 1H), 1.54-1.75 (m, 7H), 2.18 (m, 1H), 3.02 (s, 6H), 3.82 (s, 3H), 4.86 (s, 2H), 6.38 (d, 1H, J=16.2 Hz), 6.76-6.82 (m, 3H), 6.95 (br s, 1H), 7.24 (m, 1H), 7.42-7.49 (m, 5H), 7.57 (d, 1H, J=16.2 Hz). $^{13}$C NMR (100 MHz, CDCl₃) δ 25.6 (2 C), 25.7, 29.8 (2 C), 40.5 (2 C), 42.0, 52.2, 52.3, 110.8, 112.4 (2 C), 114.3 (d, J=22.5 Hz), 117.1 (d, J=21.7 Hz), 119.4, 121.0, 124.0, 125.3, 129.8 (2 C), 130.1, 133.0, 133.7, 135.9, 138.0 (d, J=8.5 Hz), 142.2 (d, J=2.3 Hz), 144.6 (d, J=10.1 Hz), 145.3, 150.9, 163.3 (d, J=249.3 Hz), 166.7, 176.3. IR (CHCl₃) 2928, 2855, 2223, 1717, 1647, 1610, 1506, 1490, 1200 cm 1. HRMS-ESI m/z [M+H]⁺ calcd for C₃₃H₃₅FN₃O₃ 540.2657, found 540.2663.

Practice Example 4

Preparation of (E)-3-(3-((2-cyano-4'-dimethylaminobiphenyl-4-ylmethyl)cyclohexanecarbonylamino)phenyl)acrylic Acid Cyclopropyl Ester (Example 23)

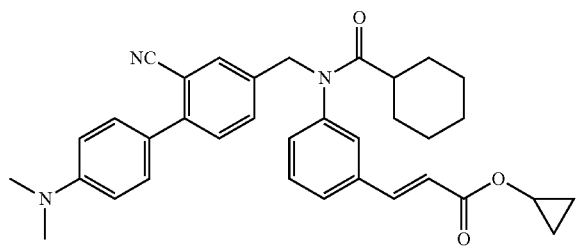 [SMILES: CN(C)c1ccc(-c2ccc(CN(C(=O)C3CCCCC3)c3cccc(/C=C/C(=O)OC4CC4)c3)cc2C#N)cc1]

To a stirred solution of (E)-3-(3-((2-cyano-4'-dimethylaminobiphenyl-4-ylmethyl)cyclohexanecarbonylamino)phenyl)acrylic acid methyl ester (0.40 g, 0.77 mmol) in THF/H₂O/MeOH (4:2:1, 28 mL) was added LiOH H₂O (64 mg, 1.53 mmol), and the mixture was stirred at room temperature overnight. The reaction mixture was concentrated to ~5 mL under reduced pressure, and the residue was dissolved in H₂O (40 mL). The pH of the aqueous solution was adjusted to 4-5 with 1 N HCl, and the resulting white precipitates were extracted with CH₂Cl₂ (40 mL). The CH₂Cl₂ solution was washed with H₂O (20 mL) and brine (20 mL), dried over anhydrous Na₂SO₄, filtered, and evaporated to dryness under reduced pressure to afford 0.39 g of (E)-3-(3-((2-cyano-4'-dimethylaminobiphenyl-4-ylmethyl)cyclohexanecarbonylamino)phenyl)acrylic acid as a yellow solid. Yield 100%. $^1$H NMR (400 MHz, CDCl₃) δ 0.91-1.03 (m, 2H), 1.15-1.27 (m, 1H), 1.52-1.74 (m, 7H), 2.17 (m, 1H), 3.01 (s, 6H), 4.88 (s, 2H), 6.42 (d, 1H, J=16.0 Hz), 6.80 (m, 2H), 7.04 (br d, 1H, J=7.6 Hz), 7.21 (br s, 1H), 7.40-7.49 (m, 6H), 7.56 (br d, 1H, J=8.0 Hz), 7.73 (d, 1H, J=16.0 Hz). $^{13}$C NMR (100 MHz, CDCl₃) δ 25.6 (2 C), 25.7, 29.7 (2 C), 40.6 (2 C), 41.9, 52.4, 110.6, 112.4, 119.1, 119.4, 125.5, 128.0, 128.0, 129.8 (2 C), 130.1 (2 C), 130.4, 130.6, 133.2, 133.8, 136.2, 143.3, 145.2, 145.5, 150.9, 171.1, 176.6. IR (CHCl₃) 2928, 2855, 2223, 1707, 1636, 1611, 1489, 1200, 731 cm⁻¹. HRMS-ESI m/z [M+H]⁺ calcd for C₃₂H₃₄N₃O₃ 508.2600, found 508.2599.

To a stirred solution of (E)-3-(3-((2-cyano-4'-dimethylaminobiphenyl-4-ylmethyl)-cyclohexanecarbonylamino)phenyl)acrylic acid (140 mg, 0.28 mmol) and Et₃N (115 μL, 84 mg, 0.83 mmol) in anhydrous CH₂Cl₂ (3 mL) was added oxalyl chloride (28 μL, 42 mg, 0.33 mmol) in a dropwise manner at 10° C. under N₂ atmosphere, and the mixture was stirred at the same temperature for 4 h. To it, cyclopropanol (87 μL, 80 mg, 1.38 mmol) was added in a dropwise manner, and the mixture was stirred at room temperature overnight. The reaction mixture was diluted with H₂O (3 mL) and extracted with CH₂Cl₂ (10 mL). The CH₂Cl₂ solution was washed with H₂O (5 mL) and brine (5 mL), dried over anhydrous MgSO₄, filtered, and evaporated to dryness under reduced pressure. The residue was purified by MPLC on silica gel using EtOAc/hexane (3:7) as eluent to afford 86 mg of the titled compound as an off-white solid. Yield 57%. $^1$H NMR (400 MHz, CDCl₃) δ 0.77 (m, 4H), 0.89-1.01 (m, 2H), 1.14-1.25 (m, 1H), 1.53-1.70 (m, 7H), 2.15 (m, 1H), 3.01 (s, 6H), 4.22-4.28 (m, 1H), 4.86 (s, 2H), 6.33 (d, 1H, J=16.0 Hz), 6.79 (m, 2H), 7.02 (br d, 1H, J=7.6 Hz), 7.15 (br s, 1H), 7.37-7.52 (m, 7H), 7.61 (d, 1H, J=16.0 Hz). $^{13}$C NMR (100 MHz, CDCl₃) δ 5.4 (2 C), 25.6 (2 C), 25.7, 29.7 (2 C), 40.5 (2 C), 41.8, 49.4, 52.3, 110.6, 112.4, 119.4, 119.6, 125.4, 127.71, 127.75, 129.73, 130.00, 130.03, 130.53, 133.23, 133.77, 136.2, 136.4, 143.2, 143.5, 145.1, 150.8, 167.5, 176.5. IR (CHCl₃) 2924, 2851, 2223, 1717, 1640, 1611, 1489, 1171 cm⁻¹. HRMS-ESI m/z [M+H]⁺ calcd for C₃₅H₃₈N₃O₃ 548.2908, found 548.2915.

The compounds listed in the following Table 1 were prepared in an analogous manner to those described in the Practice Examples 1-4 above.

TABLE 1

Structures, $^1$H NMR, and HRMS spectral data of Examples 1-24

| Example | Structure | $^1$H NMR (ppm) | HRMS (ESI) m/z (M + H)⁺ |
|---|---|---|---|
| 1 | | (400 MHz, CDCl₃) δ 1.16-1.29 (m, 3 H), 1.35-1.44 (m, 2 H), 1.60-1.63 (m, 1 H), 1.69-1.74 (m, 2 H), 1.84-1.88 (m, 2 H), 2.25-2.32 (m, 1 H), 2.97 (s, 6 H), 3.78 (s, 3 H), 4.36 (s, 2 H), 5.06 (s, 2 H), 6.37 (d, 1 H, J = 16.0 Hz), 6.65-6.67 (m, 1 H), 6.73-6.77 (m, 3 H), 6.89 (d, 1 H, J = 7.6 Hz), 7.17 (t, 1 H, J = 8.0 Hz), 7.20-7.23 (m, 2 H), 7.28 (d, 1 H, J = 7.6 Hz), 7.33 (dd, 1 H, J = 8.0, 2.0 Hz), 7.42 (d, 1 H, J = 2.0 Hz), 7.62 (d, 1 H, J = 16.0 Hz). | 527.2906 |

TABLE 1-continued

Structures, $^1$H NMR, and HRMS spectral data of Examples 1-24

| Example | Structure | $^1$H NMR (ppm) | HRMS (ESI) m/z (M + H)$^+$ |
|---|---|---|---|
| 2 | | (400 MHz, CDCl$_3$) δ 0.91-1.00 (m, 2 H), 1.18-1.23 (m, 1 H), 1.54-1.68 (m, 7 H), 2.13-2.19 (m, 1 H), 2.99 (s, 6 H), 3.28 (s, 3 H), 3.80 (s, 3 H), 4.32 (s, 2 H), 4.90 (s, 2 H), 6.35 (d, 1 H, J = 16.0 Hz), 6.75-6.79 (m, 2 H), 7.06 (d, 1 H, J = 7.6 Hz), 7.14-7.17 (m, 2 H), 7.20-7.28 (m, 4 H), 7.37 (t, 1 H, J = 7.6 Hz), 7.46 (d, 1 H, J = 7.6 Hz), 7.62 (d, 1 H, J = 16.0 Hz). | 541.3063 |
| 3 | | (400 MHz, CDCl$_3$) δ 0.94-0.97 (m, 2 H), 1.18-1.23 (m, 1 H), 1.54-1.68 (m, 7 H), 2.16 (m, 1 H), 2.98 (s, 6 H), 3.80 (s, 3 H), 3.88-3.91 (m, 2 H), 4.07-4.09 (m, 2 H), 4.91 (s, 2 H), 5.69 (s, 1 H), 6.38 (d, 1 H, J = 16.0 Hz), 6.74-6.78 (m, 2 H), 7.06 (d, 1 H, J = 7.6 Hz), 7.18-7.23 (m, 3 H), 7.29-7.33 (m, 2 H), 7.36 (t, 1 H, J = 7.6 Hz), 7.46-7.47 (m, 2 H), 7.63 (d, 1 H, J = 16.0 Hz). | 569.3015 |
| 4 | | (400 MHz, CDCl$_3$) δ 0.90-1.02 (m, 2 H), 1.14-1.27 (m, 1 H), 1.53-1.71 (m, 7 H), 2.16 (m, 1 H), 3.02 (s, 6 H), 3.82 (s, 3 H), 4.87 (s, 2 H), 6.39 (d, 1 H, J = 16.0 Hz), 6.77-6.82 (m, 2 H), 7.02 (br d, 1 H, J = 8.8 Hz), 7.16 (br s, 1 H), 7.38-7.49 (m, 6 H), 7.52 (br d, 1 H, J = 7.6 Hz), 7.64 (d, 1 H, J = 16.0 Hz). | 522.2749 |
| 5 | | (400 MHz, CDCl$_3$) δ 0.91-1.03 (m, 2 H), 1.14-1.27 (m, 1 H), 1.53-1.71 (m, 7 H), 2.16 (s, 3 H), 2.17 (m, 1 H, overlapped), 2.98 (s, 6 H), 3.82 (s, 3 H), 4.89 (s, 2 H), 6.38 (d, 1 H, J = 16.0 Hz), 6.60-6.65 (m, 2 H), 7.02-7.10 (m, 2 H), 7.13 (br s, 1 H), 7.29 (d, 1 H, J = 8.0 Hz), 7.38-7.46 (m, 3 H), 7.52 (br d, 1 H, J = 7.6 Hz), 7.62 (d, 1 H, J = 16.0 Hz). | 536.2908 |
| 6 | | (400 MHz, CDCl$_3$) δ 0.90-1.02 (m, 2 H), 1.13-1.27 (m, 1 H), 1.51-1.72 (m, 7 H), 2.16 (m, 1 H), 3.00 (s, 6 H), 3.81 (s, 3 H), 4.88 (s, 2 H), 6.39 (d, 1 H, J = 16.2 Hz), 6.47 (dd, 1 H, J = 14.0, 2.4 Hz), 6.54 (dd, 1 H, J = 8.8, 2.4 Hz), 7.02 (br d, 1 H, J = 7.6 Hz), 7.16 (br s, 1 H), 7.26 (t, 1 H, J = 8.8 Hz), 7.38-7.49 (m, 4 H), 7.52 (br d, 1 H, J = 7.6 Hz), 7.64 (d, 1 H, J = 16.2 Hz). | 540.2658 |
| 7 | | (400 MHz, CDCl$_3$) δ 0.90-1.02 (m, 2 H), 1.14-1.27 (m, 1 H), 1.53-1.71 (m, 7 H), 2.16 (m, 1 H), 3.00 (s, 6 H), 3.82 (s, 3 H), 4.90 (s, 2 H), 6.37 (d, 1 H, J = 16.0 Hz), 6.65 (dd, 1 H, J = 8.6, 2.6 Hz), 6.78 (d, 1 H, J = 2.6 Hz), 7.04 (br d, 1 H, J = 7.8 Hz), 7.12 (br s, 1 H), 7.18 (d, 1 H, J = 8.6 Hz), 7.36-7.49 (m, 4 H), 7.52 (br d, 1 H, J = 7.8 Hz), 7.62 (d, 1 H, J = 16.0 Hz). | 556.2361 |
| 8 | | (400 MHz, CDCl$_3$) δ 0.90-1.03 (m, 2 H), 1.13-1.30 (m, 1 H), 1.50-1.73 (m, 7 H), 2.16 (m, 1 H), 3.04 (s, 6 H), 3.82 (s, 3 H), 4.90 (s, 2 H), 6.41 (d, 1 H, J = 16.0 Hz), 6.94 (dd, 1 H, J = 2.8, 8.8 Hz), 6.98 (s, 1 H), 7.00 (d, 1 H, J = 3.2 Hz), 7.18 (br s, 1 H), 7.37-7.57 (m, 6 H), 7.65 (d, 1 H, J = 16.0 Hz). | 547.2707 |
| 9 | | (400 MHz, CDCl$_3$) δ 0.91-1.04 (m, 2 H), 1.15-1.26 (m, 1 H), 1.34 (t, 3 H, J = 7.2 Hz), 1.52-1.73 (m, 7 H), 2.16 (m, 1 H), 3.01 (s, 6 H), 4.27 (q, 2 H, J = 7.2 Hz), 4.87 (s, 2 H), 6.39 (d, 1 H, J = 16.0 Hz), 6.79 (m, 2 H), 7.01 (br d, 1 H, J = 7.2 Hz), 7.17 (br s, 1 H), 7.38-7.48 (m, 6 H), 7.52 (br d, 1 H, J = 8.0 Hz), 7.62 (d, 1 H, J = 16.0 Hz). | 536.2917 |

TABLE 1-continued

Structures, $^1$H NMR, and HRMS spectral data of Examples 1-24

| Example | Structure | $^1$H NMR (ppm) | HRMS (ESI) m/z (M + H)$^+$ |
|---|---|---|---|
| 10 | | (400 MHz, CDCl$_3$) δ 0.91-1.03 (m, 2 H), 1.15-1.27 (m, 1 H), 1.31 (d, 6 H, J = 6.4 Hz), 1.52-1.72 (m, 7 H), 2.16 (m, 1 H), 3.00 (s, 6 H), 4.86 (s, 2 H), 5.13 (sep, 1 H, J = 6.4 Hz), 6.37 (d, 1 H, J = 16.0 Hz), 6.75-6.81 (m, 2 H), 7.00 (br d, 1 H, J = 7.6 Hz), 7.17 (br s, 1 H), 7.36-7.48 (m, 6 H), 7.51 (br d, 1 H, J = 8.0 Hz), 7.60 (d, 1 H, J = 16.0 Hz). | 550.3072 |
| 11 | | (400 MHz, CDCl$_3$) δ 0.94-1.06 (m, 2 H), 1.16-1.27 (m, 1 H), 1.54-1.75 (m, 7 H), 2.18 (m, 1 H), 3.02 (s, 6 H), 3.82 (s, 3 H), 4.86 (s, 2 H), 6.38 (d, 1 H, J = 16.2 Hz), 6.76-6.82 (m, 3 H), 6.95 (br s, 1 H), 7.24 (m, 1 H), 7.42-7.49 (m, 5 H), 7.57 (d, 1 H, J = 16.2 Hz). | 540.2663 |
| 12 | | (400 MHz, CDCl$_3$) δ 0.93-1.06 (m, 2 H), 1.15-1.26 (m, 1 H), 3.02 (s, 6 H), 4.27 (q, 2 H, J = 7.2 Hz), 4.86 (s, 2 H), 1.34 (t, 3 H, J = 7.2 Hz), 1.53-1.75 (m, 7 H), 2.18 (m, 1 H), 6.38 (d, 1 H, J = 16.0 Hz), 6.75-6.82 (m, 3 H), 6.95 (br s, 1 H), 7.24 (m, 1 H), 7.41-7.49 (m, 5 H), 7.56 (d, 1 H, J = 16.0 Hz). | 554.2818 |
| 13 | | (400 MHz, CDCl$_3$) δ 0.95-1.05 (m, 2 H), 1.18-1.30 (m, 1 H), 1.31 (d, 6 H, J = 6.4 Hz), 1.54-1.75 (m, 7 H), 2.18 (m, 1 H), 3.01 (s, 6 H), 4.86 (s, 2 H), 5.14 (sep, 1 H, J = 6.4 Hz), 6.36 (d, 1 H, J = 16.0 Hz), 6.74-6.82 (m, 3 H), 6.96 (br s, 1 H), 7.23 (br d, 1 H, J = 9.2 Hz), 7.42-7.49 (m, 5 H), 7.54 (d, 1 H, J = 16.0 Hz). | 568.2975 |
| 14 | | (400 MHz, CDCl$_3$) δ 0.92-1.03 (m, 2 H), 1.16-1.24 (m, 1 H), 1.52-1.73 (m, 7 H), 2.12 (m, 1 H), 3.02 (s, 6 H), 3.82 (s, 3 H), 4.84 (s, 2 H), 6.46 (d, 1 H, J = 16.2 Hz), 6.79 (m, 2 H), 6.95-7.00 (m, 1 H), 7.12 (pseudo t, 1 H, J = 9.2 Hz), 7.16 (dd, 1 H, J = 6.4, 2.8 Hz), 7.42-7.49 (m, 5 H), 7.72 (d, 1 H, J = 16.2 Hz). | 540.2659 |
| 15 | | (400 MHz, CDCl$_3$) δ 0.91-1.04 (m, 2 H), 1.14-1.24 (m, 1 H), 1.33 (t, 3 H, J = 7.2 Hz), 1.52-1.74 (m, 7 H), 2.12 (m, 1 H), 3.01 (s, 6 H), 4.27 (q, 2 H, J = 7.2 Hz), 4.84 (s, 2 H), 6.45 (d, 1 H, J = 16.4 Hz), 6.79 (m, 2 H), 6.94-6.99 (m, 1 H), 7.11 (pseudo t, 1 H, J = 9.2 Hz), 7.18 (dd, 1 H, J = 6.0, 2.4 Hz), 7.41-7.48 (m, 5 H), 7.71 (d, 1 H, J = 16.4 Hz). | 554.2818 |
| 16 | | (400 MHz, CDCl$_3$) δ 0.92-1.03 (m, 2 H), 1.13-1.26 (m, 1 H), 1.30 (d, 6 H, J = 6.0 Hz), 1.52-1.73 (m, 7 H), 2.12 (m, 1 H), 3.00 (s, 6 H), 4.84 (s, 2 H), 5.13 (sep, 1 H, J = 6.0 Hz), 6.43 (d, 1 H, J = 16.2 Hz), 6.78 (m, 2 H), 6.94 6.99 (m, 1 H), 7.11 (pseudo t, 1 H, J = 9.2 Hz), 7.18 (dd, 1 H, J = 6.4, 2.4 Hz), 7.40-7.48 (m, 5 H), 7.69 (d, 1 H, J = 16.2 Hz). | 590.2794 |
| 17 | | (400 MHz, CDCl$_3$) δ 0.90-1.05 (m, 2 H), 1.13-1.24 (m, 1 H), 1.51-1.72 (m, 7 H), 2.07 (m, 1 H), 3.00 (s, 6 H), 3.82 (s, 3 H), 4.44 (d, 1 H, J = 14.8 Hz), 5.23 (d, 1 H, J = 14.8 Hz), 6.55 (d, 1 H, J = 16.2 Hz), 6.78 (m, 2 H), 7.00 (m, 1 H), 7.15 (pseudo t, 1 H, J = 8.0 Hz), 7.37-7.47 (m, 5 H), 7.56 (m, 1 H), 7.80 (d, 1 H, J = 16.2 Hz). | 540.2665 |

TABLE 1-continued

Structures, ¹H NMR, and HRMS spectral data of Examples 1-24

| Example | Structure | ¹H NMR (ppm) | HRMS (ESI) m/z (M + H)⁺ |
|---|---|---|---|
| 18 | | (400 MHz, CDCl₃) δ 0.94-1.05 (m, 2 H), 1.14-1.28 (m, 1 H), 1.35 (t, 3 H, J = 7.2 Hz), 1.52-1.75 (m, 7 H), 2.08 (m, 1 H), 3.01 (s, 6 H), 4.29 (q, 2 H, J = 7.2 Hz), 4.43 (d, 1 H, J = 14.4 Hz), 5.25 (d, 1 H, J = 14.4 Hz), 6.55 (d, 1 H, J = 16.2 Hz), 6.78 (m, 2 H), 6.99 (m, 1 H), 7.15 (pseudo t, 1 H, J = 7.8 Hz), 7.38-7.48 (m, 5 H), 7.56 (m, 1 H), 7.79 (d, 1 H, J = 16.2 Hz). | 576.2639 (M + Na)⁺ |
| 19 | | (400 MHz, CDCl₃) δ 0.93-1.05 (m, 2 H), 1.15-1.26 (m, 1 H), 1.33 (d, 6 H, J = 6.4 Hz), 1.51-1.75 (m, 7 H), 2.08 (m, 1 H), 3.01 (s, 6 H), 4.42 (d, 1 H, J = 14.8 Hz), 5.16 (sep, 1 H, J = 6.4 Hz), 5.26 (d, 1 H, J = 14.8 Hz), 6.53 (d, 1 H, J = 16.2 Hz), 6.79 (m, 2 H), 6.98 (m, 1 H), 7.15 (pseudo t, 1 H, J = 8.0 Hz), 7.38-7.48 (m, 5 H), 7.56 (m, 1 H), 7.77 (d, 1 H, J = 16.2 Hz). | 590.2795 |
| 20 | | (400 MHz, CDCl₃) δ 0.93-1.05 (m, 2 H), 1.14-1.25 (m, 1 H), 1.52-1.75 (m, 7 H), 2.08 (m, 1 H), 3.01 (s, 6 H), 3.80 (s, 3 H), 4.60 (d, 1 H, J = 14.8 Hz), 5.09 (d, 1 H, J = 14.8 Hz), 6.29 (d, 1 H, J = 16.0 Hz), 6.79 (m, 2 H), 7.13 (dd, 1 H, J = 7.0, 2.2 Hz), 7.20 (pseudo t, 1 H, J = 8.8 Hz), 7.39-7.48 (m, 5 H), 7.50-7.54 (m, 1 H), 7.56 (d, 1 H, J = 16.0 Hz). | 562.2480 (M + Na)⁺ |
| 21 | | (400 MHz, CDCl₃) δ 0.94-1.06 (m, 2 H), 1.15-1.25 (m, 1 H), 1.33 (t, 3 H, J = 7.2 Hz), 1.52-1.75 (m, 7 H), 2.08 (m, 1 H), 3.01 (s, 6 H), 4.26 (q, 2 H, J = 7.2 Hz), 4.61 (d, 1 H, J = 14.4 Hz), 5.07 (d, 1 H, J = 14.4 Hz), 6.29 (d, 1 H, J = 16.2 Hz), 6.79 (m, 2 H), 7.14 (dd, 1 H, J = 7.0, 2.2 Hz), 7.20 (pseudo t, 1 H, J = 8.8 Hz), 7.39-7.48 (m, 5 H), 7.50-7.55 (m, 1 H), 7.55 (d, 1 H, J = 16.2 Hz). | 576.2637 (M + Na)⁺ |
| 22 | | (400 MHz, CDCl₃) δ 0.94-1.05 (m, 2 H), 1.15-1.26 (m, 1 H), 1.30 (d, 6 H, J = 6.4 Hz), 1.52-1.76 (m, 7 H), 2.08 (m, 1 H), 3.00 (s, 6 H), 4.63 (d, 1 H, J = 14.6 Hz), 5.06 (d, 1 H, J = 14.6 Hz), 5.13 (sep, 1 H, J = 6.4 Hz), 6.27 (d, 1 H, J = 16.0 Hz), 6.79 (m, 2 H), 7.15 (dd, 1 H, J = 7.4, 2.2 Hz), 7.19 (pseudo t, 1 H, J = 8.8 Hz), 7.39-7.54 (m, 6 H), 7.53 (d, 1 H, J = 16.0 Hz). | 590.2790 (M + Na)⁺ |
| 23 | | (400 MHz, CDCl₃) δ 0.77 (m, 4 H), 0.89-1.01 (m, 2 H), 1.14-1.25 (m, 1 H), 1.53-1.70 (m, 7 H), 2.15 (m, 1 H), 3.01 (s, 6 H), 4.22- 4.28 (m, 1 H), 4.86 (s, 2 H), 6.33 (d, 1 H, J = 16.0 Hz), 6.79 (m, 2 H), 7.02 (br d, 1 H, J = 7.6 Hz), 7.15 (br s, 1 H), 7.37-7.52 (m, 7 H), 7.61 (d, 1 H, J = 16.0 Hz). | 548.2915 |
| 24 | | (400 MHz, CDCl₃) δ 0.94-1.07 (m, 2 H), 1.16-1.27 (m, 1 H), 1.54-1.76 (m, 7 H), 2.19 (m, 1 H), 3.01 (s, 6 H), 4.87 (s, 2 H), 6.41 (d, 1 H, J = 16.2 Hz), 6.77-6.83 (m, 3 H), 7.00 (br s, 1 H), 7.27 (m, 1 H, overlapped), 7.43-7.50 (m, 5 H), 7.66 (d, 1 H, J = 16.2 Hz). | 526.2506 |

Biological Evaluation

The biological activity of the compounds of the invention may be assessed using the following assays:

FXR Assay

PathHunter® CHO-K1 FXR protein interaction cells were expanded from freezer stocks according to standard procedures. Cells were seeded in a total volume of 20 µL into white walled, 384-well microplates and incubated at 37° C. for the appropriate time prior to testing. Assay media contained charcoal-dextran filtered serum to reduce the level of hormones present. For agonist determination, cells were incubated with sample to induce response. Intermediate dilution of sample stocks was performed to generate 5× sample in assay buffer. 5 µL of 5× sample was added to cells and incubated at 37° C. or room temperature for 3-16 h. Final assay vehicle concentration was 1%. For antagonist determination, cells were pre-incubated with antagonist followed by agonist challenge at the $EC_{80}$ concentration. Intermediate dilution of sample stocks was performed to generate 5× sample in assay buffer. 5 µL of 5× sample was added to cells and incubated at 37° C. or room temperature for 60 min. Vehicle concentration was 1%. 5 µL of 6×$EC_{80}$ agonist in assay buffer was added to the cells and incubated at 37° C. or room temperature for 3-16 h. Assay signal was generated through a single addition of 12.5 or 15 μL (50% v/v) of PathHunter® detection reagent cocktail, followed by a 1 h incubation at room temperature. Microplates were read following signal generation with a PerkinElmer Envision™ instrument for chemiluminescent signal detection. Compound activity was analyzed using CBIS data analysis suite (ChemInnovation, CA). For agonist mode assays, percentage activity was calculated using the following formula:

% Activity=100%×(mean RLU of test sample−mean RLU of vehicle control)/(mean MAX control ligand−mean RLU of vehicle control).

For antagonist mode assays, percentage inhibition was calculated using the following formula:

% Inhibition=100%×(1−(mean RLU of test sample−mean RLU of vehicle control)/(mean RLU of $EC_{80}$ control−mean RLU of vehicle control)).

Agonistic activity of Examples 1-4 along with GW4064 and fexaramine as reference agonists on FXR was determined in NHR protein interaction assay (DiscoverX technology) (Table 2). In this assay, two weakly complementing fragments of the β-galactosidase are expressed within stably transfected cells. The complementing fragments of the β-galactosidase are translationally fused to the C-terminus of a full-length FXR and to the steroid receptor coactivator peptide (SRCP), respectively. When bound by ligand, the FXR will migrate to the nucleus and recruit the SRCP domain, whereby complementation occurs, generating a unit of active β-galactosidase and production of chemiluminescent signal. Thus, measurement of chemiluminescent signal directly reflects FXR-coactivator interaction.

TABLE 2

Agonistic activity of Examples 1-4 on FXR in protein interaction assay[a]

| Example | $EC_{50}$[b,c] (μM) | % max. rel. efficacy[b,c] |
|---|---|---|
| 1 | NA | 1 |
| 2 | >10 | 5 |
| 3 | NA | 3 |
| 4 | 0.8 | 24 |
| Fexaramine | 0.8 | 21 |
| GW4064 | 0.4 | 100 |

[a]PathHunter® NHR Protein Interaction Assay was performed at Eurofins DiscoverX (Fremont, CA).
[b]Compound was tested in 5 different concentrations with 3-fold serial dilution starting at 3.3 μM. Control compound (GW4064) was tested in 10 different concentrations with 3-fold serial dilution starting at 10 μM.
[c]Activity is given as the mean of one experiment run in duplicate.
[d]NA, inactive at 3.3 μM.

GW4064 exhibited maximum efficacy of 100% at 3.3 μM with an $EC_{50}$ value of 0.4 μM, and fexaramine exhibited 21% maximum efficacy at 3.3 μM relative to GW4064 with an $EC_{50}$ value of 0.8 μM. Introduction of a hydroxymethyl (Example 1), a methoxymethyl (Example 2) and a [1,3] dioxolan-2-yl (Example 3) substituents at the C-2 in the biphenyl ring of fexaramine markedly diminished activity, suggesting that the biphenyl ring geometry generated by a larger substituent at this position is not favorable to the binding of these compounds to the FXR ligand binding domain. Gratifyingly, a CN substituent (Example 4) increased maximum relative efficacy (24%) compared with fexaramine. To date, numerous fexaramine analogs possessing both biphenyl ring and acrylic acid ester moiety in their structure were reported, but none of them displayed improved activity than fexaramine (Downes et al., WO 2004/046068 A2; Evans et al., WO 2015/138969 A1; Fang et al., WO 2016/149111 A1). Although Example 4 is listed in a patent application (Smith et al. WO 2017/049172 A1: Example 62.11), its synthetic procedure, physicochemical properties, spectral data except MS, and maximum efficacy were not disclosed. The only disclosed biological data for Example 4 is $EC_{50}$ as +++ that means $EC_{50}$≤1.

Preliminary nuclear receptor selectivity of Example 4 was determined against a panel of 18 nuclear receptors at a concentration of 100 μM using the DiscoverX technology. The Example 4 demonstrated high selectivity for FXR (47% relative efficacy to GW4064), since it did not activate other members of the nuclear receptors such as androgen receptors (AR), estrogen receptors (Erα), glucocorticoid receptors (GR), liver X receptors (LXRα, LXRβ), mineralocorticoid receptors (MR), peroxisome proliferator-activated receptors (PPARα, PPARγ, PPARδ), progesterone receptors (PRα, PRβ), retinoic acid receptors (RARα, RARβ), retinoid X receptors (RXRα, RXRγ), and thyroid hormone receptors (THRα, THRβ) (<3% relative efficacy to the respective reference compounds) (Table 3).

TABLE 3

Nuclear receptor selectivity of Example 4[a]

| nuclear receptor | % max. rel. efficacy at 100 uM[b,c] | ref. compd ($EC_{50}$, μM)[c] |
|---|---|---|
| AR | −2 | 6α-fluorotestosterone (0.008) |
| Erα | 1 | 17β-estradiol (0.005) |
| GR | 0 | dexamethasone (0.03) |
| LXRα | 0 | TO901317 (0.08) |
| LXRβ | 3 | TO901317 (0.02) |
| MR | 0 | aldosterone (0.0006) |
| PPARα | 0 | GW7647 (0.001) |
| PPARγ | 2 | troglitazone (2) |
| PPARδ | −3 | L-165,041 (0.006) |
| PRα | −1 | norgestrel (0.001) |
| PRβ | 0 | norgestrel (0.001) |
| RARα | −3 | 9-cis-retinoic acid (0.001) |
| RARβ | −11 | 9-cis-retinoic acid (0.0008) |
| RXRα | −2 | 9-cis-retinoic acid (0.006) |
| RXRγ | −4 | 9-cis-retinoic acid (0.006) |
| THRα | −1 | triiodothyronine (0.03) |
| THRβ | 1 | triiodothyronine (0.01) |
| FXR | 47 | GW4064 (0.7) |

[a]PathHunter® NHR Protein Interaction Assay was performed at DiscoverX (Fremont, CA).
[b]% Maximum relative efficacy at 100 uM to each reference compound.
[c]Activity is given as the mean of one experiment run in duplicate.

Agonistic activity of Examples 5-23 on FXR was determined in NHR protein interaction assay and compared with that of Example 4, fexaramine, and GW4064 (Table 4). In this assay, GW4064 exhibited maximum efficacy of 100% at 3.3 μM with an $EC_{50}$ value of 0.6 μM, and fexaramine exhibited maximum relative efficacy of 34% at 3.3 μM with an $EC_{50}$ value of 1.0 μM. Introduction of a F substituent (Example 6: 42% maximum relative efficacy) at the C-2' in the biphenyl ring of Example 4 slightly diminished activity compared with Example 4 (47% maximum relative efficacy), and Me (Example 5: 23% maximum relative efficacy), Cl (Example 7: 21% maximum relative efficacy), and CN (Example 8: 10% maximum relative efficacy) substituents displayed even lower activity. The effect of methyl ester group in Example 4 on FXR activation was investigated by replacing it with ethyl ester, isopropyl ester, and cyclopropyl ester. Among these esters, cyclopropyl ester, Example 23 (46% maximum relative efficacy) displayed comparable activity to Example 4, and isopropyl ester, Example 10 (44% maximum relative efficacy) and ethyl ester, Example 9 (40% maximum relative efficacy) showed slightly diminished activity. Among the fluorine-substituted analogs, Examples 11-22, the most active compound, Example 11 was obtained by adding a F in the 5-position of the aniline ring in Example 4, thus showing 56% maximum relative efficacy with an $EC_{50}$ value of 0.9 μM. Example 12, an ethyl ester analog of Example 11, displayed comparable activity to Example 4. In contrast, 6-, 2-, and 4-fluoro substitution (Examples 14-22) resulted in modest to marked decrease in maximum relative efficacy compared with Example 4. It was observed that methyl esters were more active than ethyl and isopropyl esters in the 5- and 4-F substituted analogs, whereas isopropyl esters were more active than methyl and ethyl esters in the 6- and 2-F substituted analogs.

TABLE 4

Agonistic activity of Examples 4-23 on FXR in protein interaction assay[a]

| Example | $EC_{50}^{b,c}$ (μM) | % max. rel. efficacy[b,c] |
|---|---|---|
| 4 | 1.0 | 47 |
| 5 | 1.5 | 23 |
| 6 | 0.9 | 42 |
| 7 | 1.2 | 21 |
| 8 | 1.6 | 10 |
| 9 | 1.2 | 40 |
| 10 | 0.6 | 44 |
| 11 | 0.9 | 56 |
| 12 | 1.0 | 47 |
| 13 | 0.8 | 20 |
| 14 | 1.5 | 23 |
| 15 | 1.3 | 23 |
| 16 | 0.8 | 35 |
| 17 | 1.3 | 19 |
| 18 | 1.0 | 29 |
| 19 | 0.9 | 42 |
| 20 | 1.5 | 15 |
| 21 | 1.6 | 9 |
| 22 | NA[d] | 3 |
| 23 | 0.9 | 46 |
| Fexaramine | 1.0 | 34 |
| GW4064 | 0.6 | 100 |

[a]PathHunter® NHR Protein Interaction Assay was performed at Eurofins DiscoverX (Fremont, CA).
[b]Compound was tested in 5 different concentrations with 3-fold serial dilution starting at 3.3 μM. Control compound (GW4064) was tested in 10 different concentrations with 3-fold serial dilution starting at 10 μM.
[c]Activity is given as the mean of one experiment run in duplicate.
[d]NA, inactive at 3.3 μM.

Because agonistic activity of Examples 1-23 was initially measured in one experiment run, efficacy of Example 11 and Example 4 was compared with that of fexaramine in multiple experiments run (Table 5). In this assay, Example 11 exhibited maximum efficacy of 53±3% relative to GW4064 that is significantly higher than that of fexaramine (29±4%) ($p<0.05$), and Example 4 also exhibited higher maximum relative efficacy (40±8%) than fexaramine, but no statistical significance was observed between these two compounds. The level of maximum relative efficacy of Example 11 is comparable to that of an FXR systemic partial agonist, nidufexor (57%) that showed very promising results in the treatment of NASH in a Phase II trial (NCT02913105) (Chianelli et al., J. Med. Chem. 63 (8):3868-3880 (2020)).

TABLE 5

Agonistic activity of Examples 4 and 11 on FXR in Protein Interaction Assay[a]

| Example | $EC_{50}$ (μM) | % max. rel. efficacy |
|---|---|---|
| 4 | 0.8 ± 0.1[b] | 40 ± 8[b] |
| 11 | 0.9 ± 0.0[c] | 53 ± 3[c*] |
| Fexaramine | 0.8 ± 0.1[b] | 29 ± 4[b] |
| GW4064 | 0.4 ± 0.1[b] | 100 ± 0[b] |

[a]PathHunter® NHR Protein Interaction Assay was performed at Eurofins DiscoverX (Fremont, CA).
[b]Activity is given as the mean ± SEM of three independent experiments run in duplicate.
[c]Activity is given as the mean ± SEM of two independent experiments run in duplicate. Statistical value was defined using the two-tailed Student t test.
*$p < 0.05$ versus fexaramine.

Pharmacokinetic Studies of Example 11 in Rats

To investigate whether Example 11 is indeed an intestine-selective/specific FXR agonist, its pharmacokinetic profile was evaluated. Male Sprague-Dawley rats (7-week old, 240-260 g) were purchased from Orient Bio. Inc. (Seongnam, Korea). Rats were kept in the cage maintained under a controlled environment (temperature of 23±3° C., relative humidity of 50±5%, and 12 h dark-light cycle) for at least 3 days. Rats were fasted overnight before dose administration. The Example 11 was dissolved in a mixture of DMSO, Tween 80, and 0.9% saline solution (v:v:v, 1:1:8) at a concentration of 2.5 mg/mL for intravenous injection (IV). Also, Example 11 was dissolved in corn oil for oral administration (PO). Rats were divided into two groups; IV group and PO group including at least 6 animals per group. After anesthetized with isoflurane, rats were given the dose of 5 mg/kg via IV injection or 80 mg/kg via PO administration by oral gavage into the stomach. Blood samples (approximately 0.25 mL) were obtained by subclavian vein puncture at 0, 0.033, 0.083, 0.167, 0.333, 0.667, 1, 2, 3, 5, 7, 10, and 24 h after IV injection. After PO administration, blood samples were obtained at 0, 0.083, 0.167, 0.333, 0.667, 1, 2, 3, 5, 7, 10, and 24 h post-dose. Subsequently, blood samples were collected in 1.5-mL Eppendorf tube on an ice. The tubes were centrifuged at 13500 rpm for 15 min at 4° C. to separate the plasma fraction. Then, the plasma samples were stored at −7° C. until HPLC analysis. To prepare the samples for HPLC analysis, 5 μL of Example 11 or Example 24 and 5 μL of internal standard, Example 4 were added to 45 μL of plasma. For extraction, 45 μL of MeCN was added to the mixture. Then, the mixture was vortexed for 2 min and centrifuged at 13500 rpm for 15 min at room temperature. The 60 μL of clear supernatant was transferred to an insert. Then, the HPLC auto-injector was programmed to inject 40 μL of the sample to the HPLC system for analysis. The linearity of the calibration curve was obtained by plotting the peak area ratio (area of Example 11 or area of Example 24/area of Example 4). Pharmacokinetic parameters were calculated by non-compartmental analysis of the plasma concentration-time profiles using Winnonlin® Professional version 8.01 software (Pharsight Corporation, Mountain View, CA). Oral bioavailability (F) was calculated by the ratio of the dose-corrected area under the plasma drug concentration-time curve ($AUC_{last}$) between oral administration and intravenous injection.

$$\text{Oral bioavailability (\%)} = \frac{\text{Example } 11(AUC_{po} \times \text{Dose}_{iv})}{((\text{Example } 11 \, AUC_{iv} + \text{Example } 24 \, AUC_{iv}) \times \text{Dose}_{po})} \times 100$$

Figure 2A:
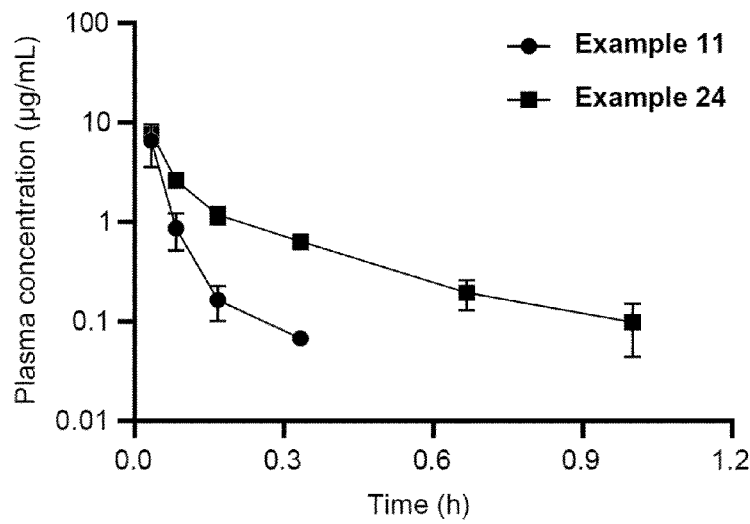
FIGS. 2A and 2B show mean plasma concentration-time curves of Example 11 and Example 24 after administration of Example 11 to rats.
Figure 2B:
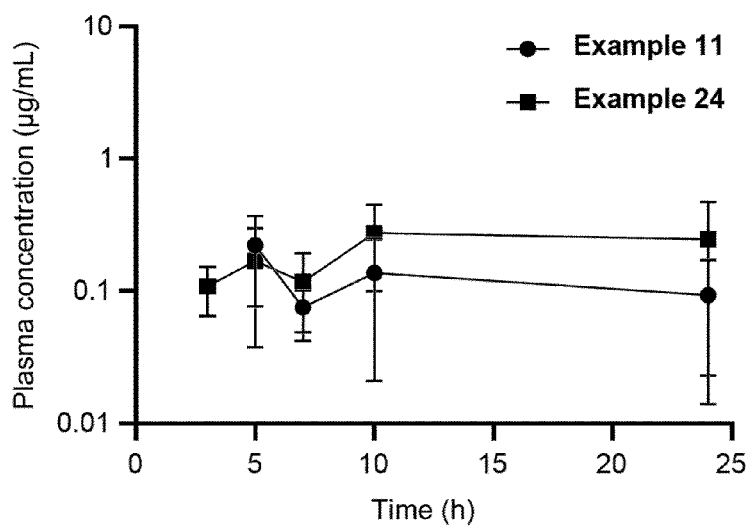
Figure 3A:
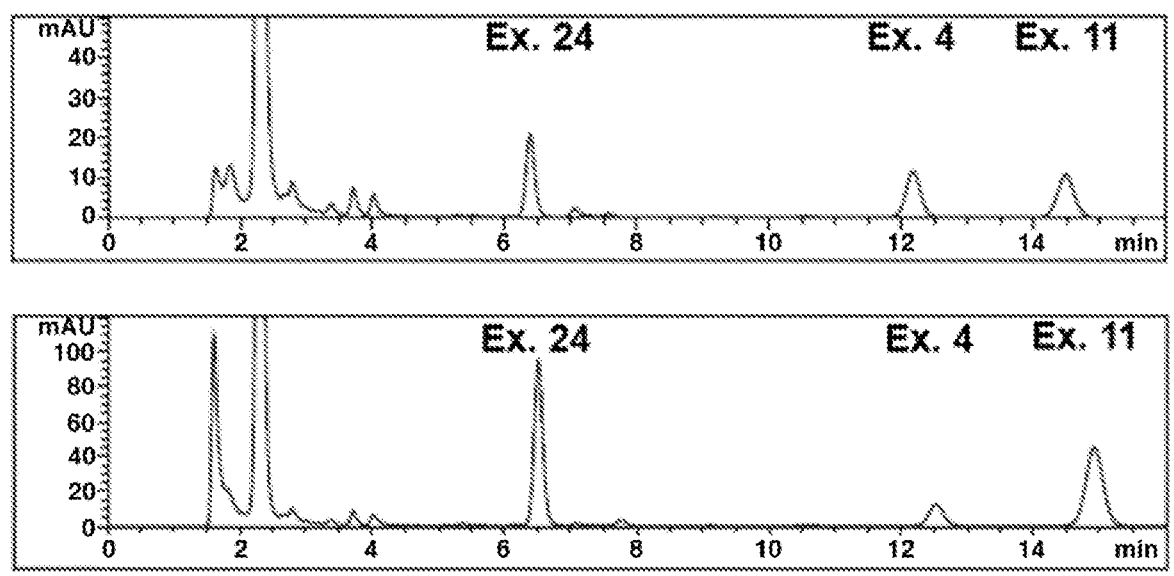
FIGS. 3A to 3C show RP-HPLC (Reversed Phase High Performance Liquid Chromatography) chromatograms obtained from PK studies in rat plasma. Chromatograms were acquired at X=269 nm.
Figure 3B:
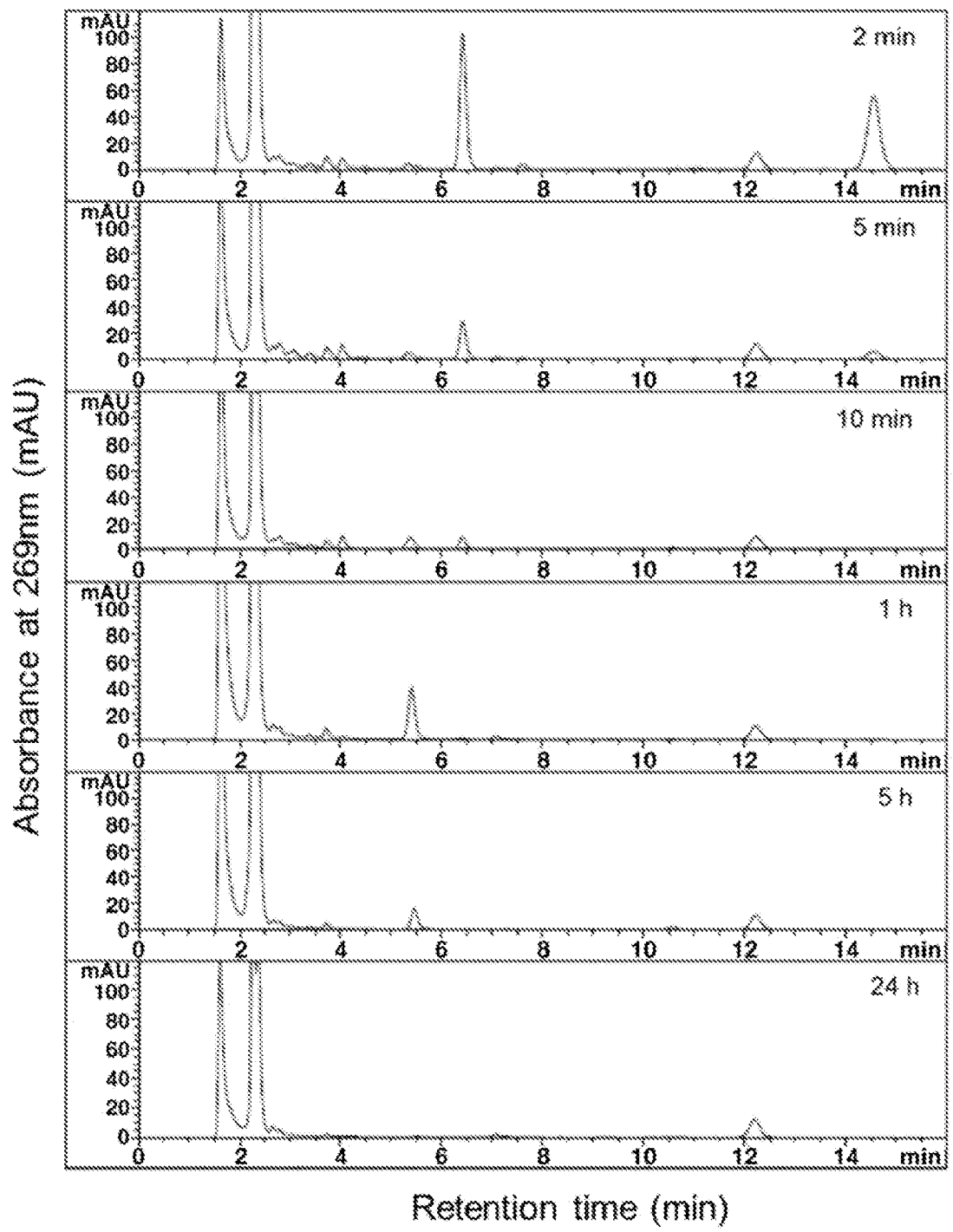
Figure 3C:
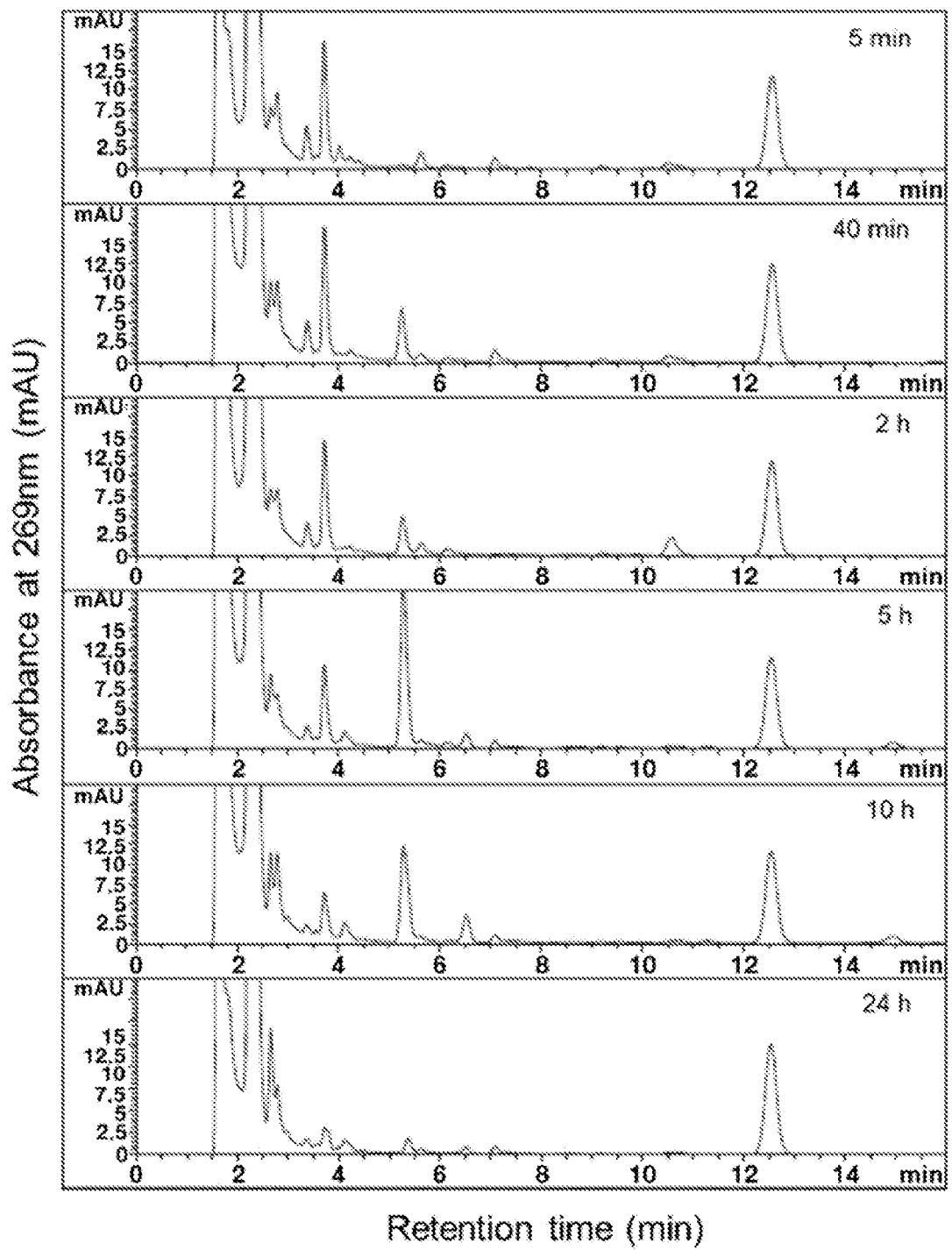

After intravenous administration, Example 11 was rapidly metabolized to the corresponding carboxylic acid, Example 24 (FIG. 2A). At 2 min after administration, the ratio of the peak area of Example 11 and Example 24 was 4.33:4.56. The Example 11 and Example 24 were detected until 20 min and 1 h in plasma after administration (FIG. 2A), and their $AUC_{last}$ were 0.9±0.1 and 1.2±0.1 µg·h/mL, respectively (Table 6). The amount of an unidentified major metabolite shown at the retention time of 5.25-5.33 min gradually increased up to 1 h, then slowly decreased (FIG. 3B). After oral administration, Example 11 and Example 24 were detected after 5 h and 3 h, respectively, in much lower amounts compared with that of an unidentified metabolite, the same one as observed after intravenous administration (FIGS. 2B and 3C), thus, oral bioavailability of Example 11 was 4%. Pharmacokinetic studies with Example 11 indicate that a substantial amount of Example 11 is absorbed in the intestine after oral administration, and then it is rapidly metabolized to Example 24 by serum esterases after entering into the portal vein.

TABLE 6

Rat PK data of Example 11[a]

| PK parameters | intravenous dose, 5 mg/kg[b] | | oral dose, 80 mg/kg[c] |
|---|---|---|---|
| | Example 11 | Example 24 | Example 11 |
| $AUC_{last}{}^d$(µg · h/mL) | 0.9 ± 0.1 | 1.2 ± 0.1 | 1.5 ± 0.6 |
| $t_{1/2}{}^e$(h) | 0.08 ± 0.06 | 0.24 ± 0.05 | ND[i] |
| $CL^f$(L/h/kg) | 5.6 ± 0.7 | 4.2 ± 0.4 | ND |
| $V_{ss}{}^g$(L/kg) | 0.7 ± 0.5 | 1.4 ± 0.2 | ND |
| $F^h$(%) | | | 4 |

[a]Pharmacokinetic parameters were estimated by a non-compartmental analysis of the mean plasma concentration (n = 4-5) versus time profile after oral and intravenous administration.
[b]Dosed as solution in a mixture of DMSO, Tween 80, and 0.9% saline solution (v:v:v, 1:1:8).
[c]Dosed as solution in corn oil.
[d]$AUC_{last}$ (AUC from zero hour to last quantifiable time point).
[e]Half-life.
[f]Clearance.
[g]Volume of distribution at steady state.
[h]Oral bioavailability.
[i]Not determined. Pharmacokinetic parameters could not be determined because most of plasma concentrations were below the lower limit of quantification (0.025 µg/mL).

Agonistic and Antagonistic Activity of Example 24

To confirm whether the metabolite of Example 11 has activity on FXR, Example 24 was prepared by alkaline hydrolysis of Example 11 in the presence of LiOH, and its agonistic activity was determined at two different concentrations of 3.3 and 10 µM in NHR protein interaction assay (Table 7). As we expected, Example 24 was inactive at these concentrations (1% maximum relative efficacy at 3.3 µM, 0% maximum relative efficacy at 10 µM). Although conversion of methyl ester to carboxylic acid in Example 11 resulted in loss of agonistic activity, carboxylic acid functionality may contribute to antagonistic activity. To determine if Example 24 has antagonistic activity, PathHunter® CHO-K1 FXR protein interaction cells were pre-incubated with three different concentrations of Example 24 (1.1, 3.3, and 10 µM) followed by GW4064 challenge at the $EC_{80}$ concentration (Table 7). In this assay, a reference antagonist, DY268 (Yu et al., Bioorg. Med. Chem. 22 (11):2919-2938 (2014)) inhibited 96% of activity at 10 µM, and Example 24 inhibited 6%, 7%, and 26% of activity at 1.1, 3.3, and 10 µM, respectively, indicating that it may act as a weak antagonist on systemic exposure of Example 11 when high plasma concentration of Example 24 is achieved. Both rapid metabolism of Example 11 to Example 24 in blood and inactivity of Example 24 on FXR activation support that Example 11 is not a systemic FXR agonist.

Fang et al. previously reported that orally administered fexaramine is an intestine-restricted FXR agonist because it is poorly absorbed into the circulation (oral bioavailability: 12%) (Fang et al., Nat. Med. 21 (2):159-165 (2015)). However, based on the results of our kinetic studies with Example 11, we speculate that the low serum concentration of fexaramine could be attributed to the rapid metabolism of its methyl ester group to the corresponding inactive carboxylic acid in the bloodstream to a large extent rather than poor absorption in the intestine.

TABLE 7

Agonistic and antagonistic activity of Example 24 on FXR in protein interaction assay[a]

| % agonistic efficacy | | | % antagonistic efficacy[c] | | | |
|---|---|---|---|---|---|---|
| Example 24 | | GW4064[b] | Example 24 | | | DY268 |
| 3.3 µM | 10 µM | 3.3 µM | 1.1 µM | 3.3 µM | 10 µM | 10 µM |
| 1%[d] | 0% | 100% | 6%[d] | 7% | 26% | 96%[e] |

[a]PathHunter ® NHR Protein Interaction Assay was performed at Eurofins DiscoverX (Fremont, CA).
[b]Control compound (GW4064) was tested in 10 different concentrations with 3-fold serial dilution starting at 10 µM.
[c]PathHunter ® CHO-K1 FXR protein interaction cells were pre-incubated with indicated concentrations of each compound followed by GW4064 challenge at the $EC_{80}$ concentration.
[d]Activity is given as the mean of one experiment run in duplicate.
[e]Activity is given as the mean of two independent experiments run in duplicate.

Molecular Docking Modes of Example 4 and Example 11

Figure 4A:
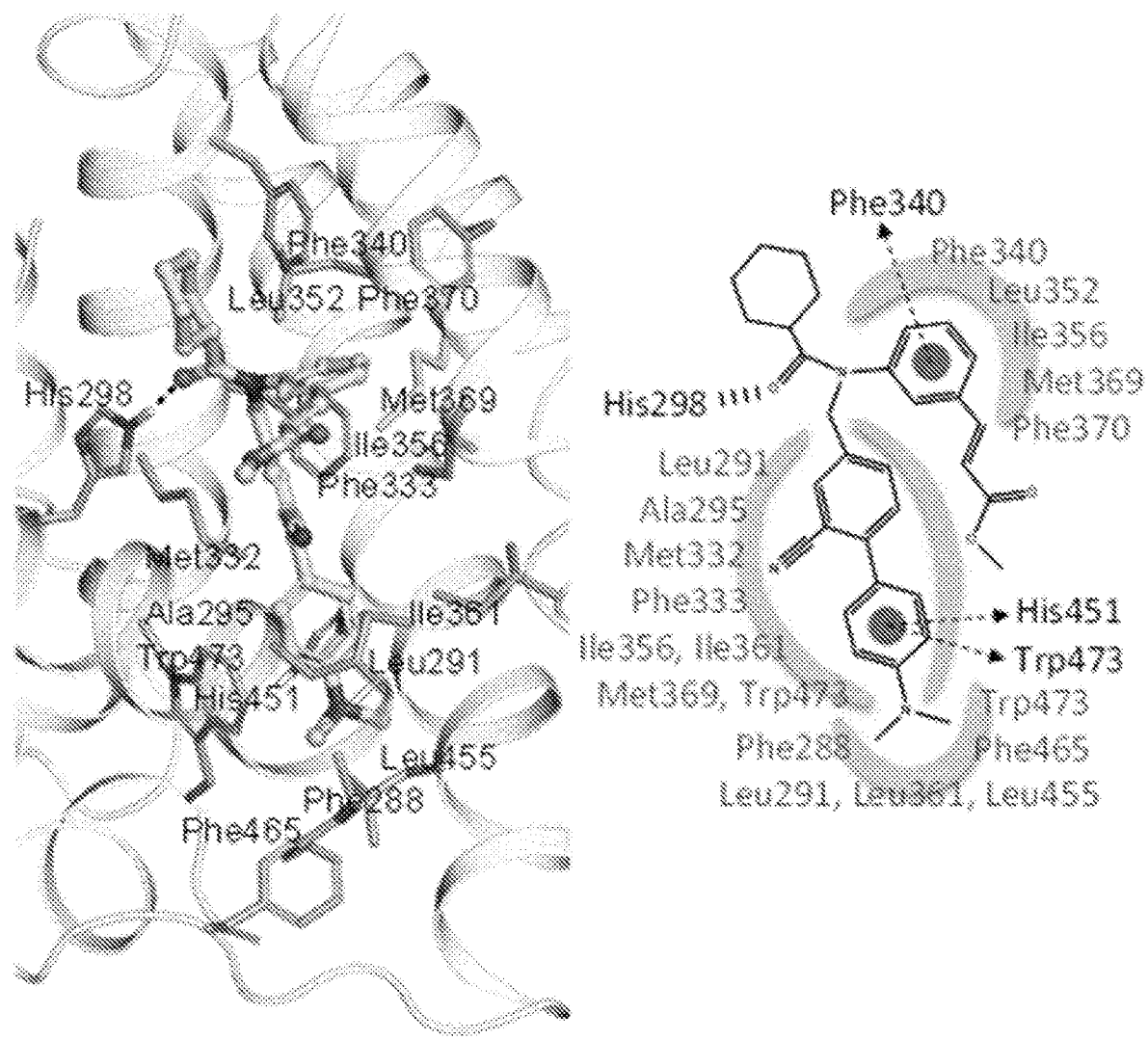
FIGS. 4A to 4C show molecular docking modes of Example 4 (FIG. 4A), Example 11 (FIG. 4B), and their superimposition in FXR binding site (PDB ID: 1OSH) (FIG. 4C). Example 4 and Example 11 are represented in ball-and-sticks with C in cyan and magenta, respectively. The interacting residues are shown as sticks and secondary structures of FXR as ribbon in white. The respective 2D representations of the protein-ligand interactions show hydrogen bonds as dashed lines, π-π interactions as blue discs with arrows, hydrophobic interactions as yellow curve patches. For clarity, nonpolar hydrogen atoms are not displayed.
Figure 4B:
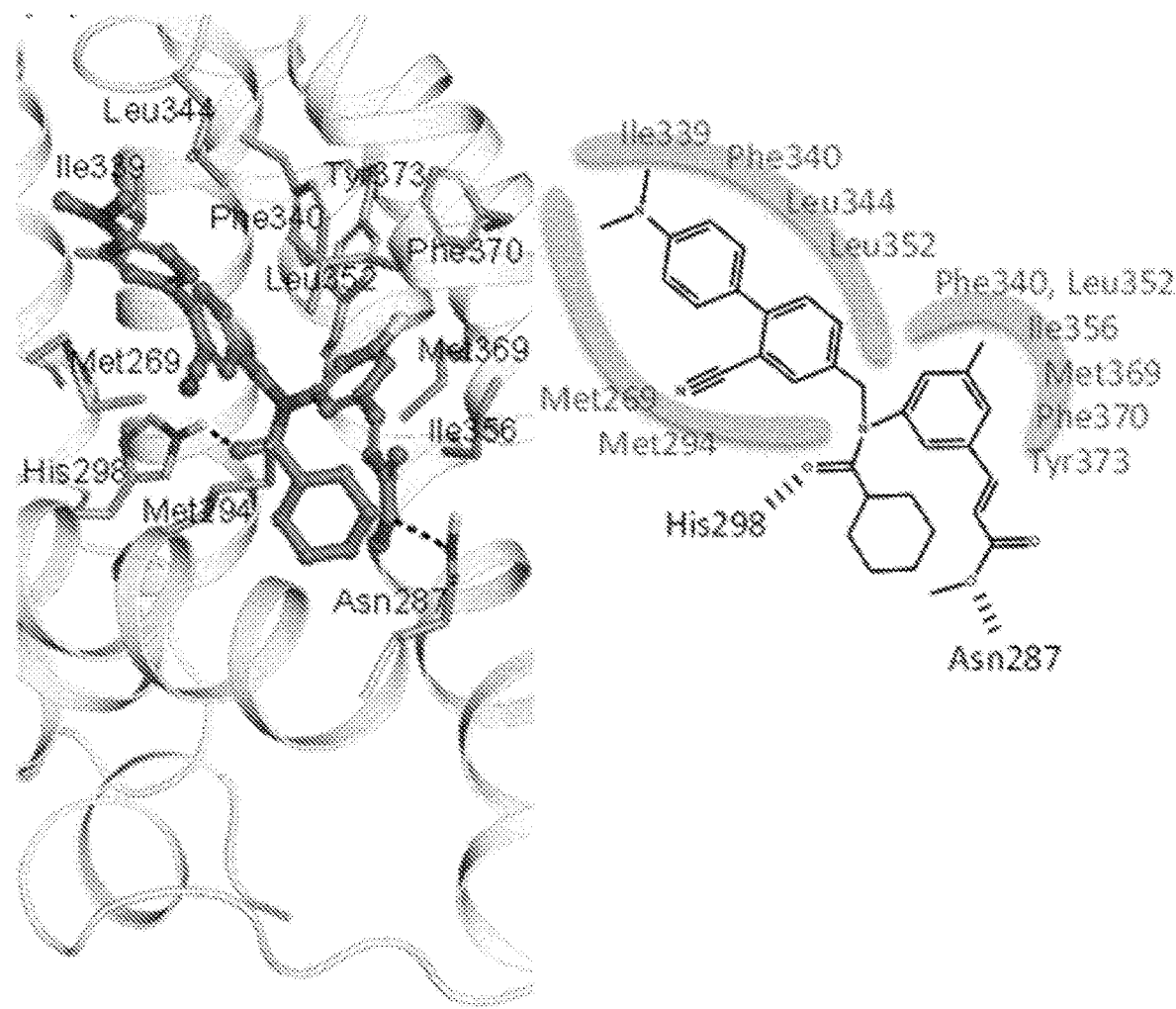
Figure 4C:
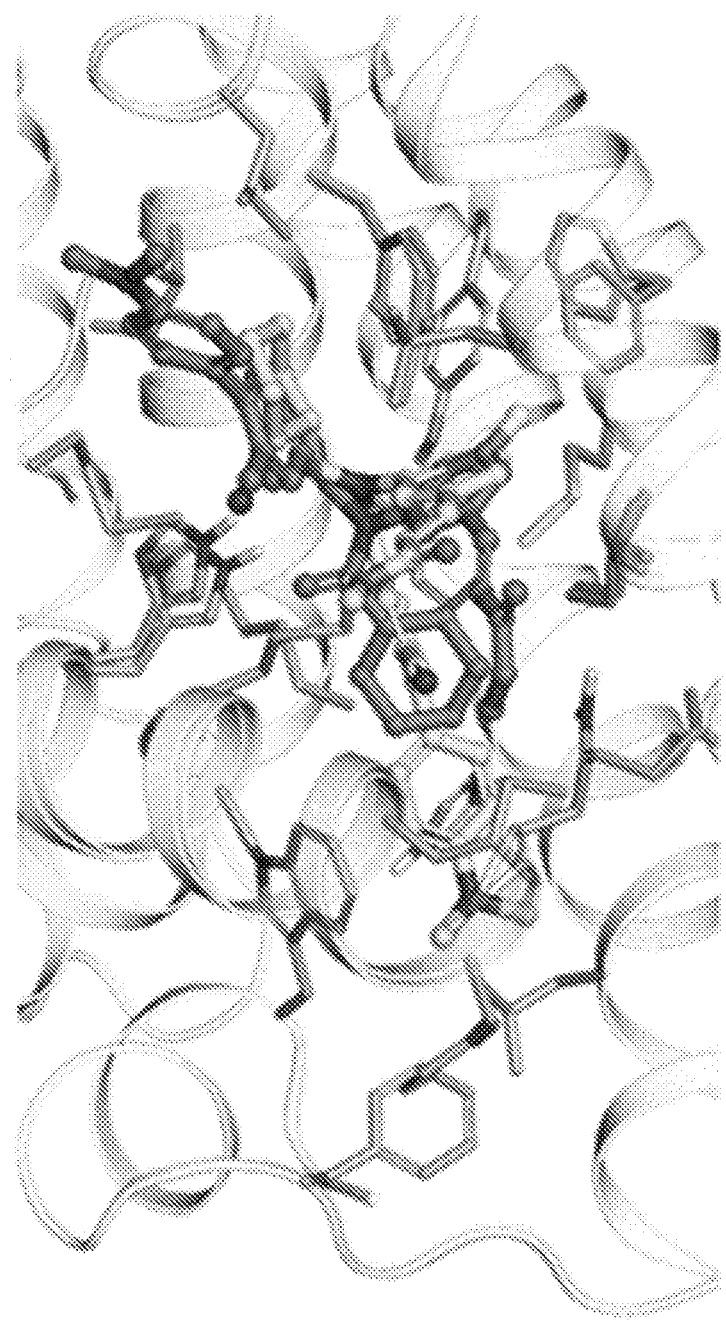

The optimum binding modes were predicted by the docking studies against FXR structure (PDB ID: 1OSH). The binding modes of Example 4 and Example 11 were investigated in induced-fit docking study, accounting for the flexibility of the target protein FXR. The structure of the ligands can be represented as three groups branching out from the central nitrogens. As shown in FIG. 4A, the biphenyl ring of Example 4 occupies the hydrophobic pocket formed by Phe288, Leu291, Ala295, Met332, Phe333, Ile356, Ile361, Met369, Leu455, Phe465, and Trp473. The ring with dimethylamino substituent is oriented by two 71-71 interactions with His451 and Trp473. In another hydrophobic pocket recruiting Phe340, Leu352, Ile356, Met369, and Phe370, the single phenyl ring manages the position where it forms an additional 71-71 interaction with Phe340. Meanwhile, the amide oxygen involves in a hydrogen bond with His298, contributing to the binding pose of Example 4 with overall arrangements similar to that of FXR-cocrystallized ligand, fexaramine (Downes et al., Mol. Cell 11 (4):1079-1092 (2003)). The binding pose of Example 11 is shown in FIG. 4B. The biphenyl group probes hydrophobic interactions with Met269, Met294, Ile339, Phe340, Leu344, and Leu352. In this position, the dimethylamine moiety forms a hydrophobic bond with Leu344, pointing out at the center of the allosteric binding site identified in the previous study of FXR (Chen et al., J. Chem. Inf Model. 60 (3):1540-1550 (2020)). The fluorine occupies the hydrophobic pocket formed by Phe340, Leu352, Ile356, Met369, Phe370, and Tyr373. Those hydrophobic interactions may anchor the single phenyl group in the position that allows the methyl ester group to form a hydrogen bond with Asn287. In addition, the amide carbonyl oxygen of Example 11 joins His298 in a hydrogen bond which is observed in FXR-Example 4 complex and FXR-fexaramine crystal structure (Downes et al., *Mol. Cell* 11 (4):1079-1092 (2003)).

To develop an intestine-selective/specific FXR partial agonist, we have synthesized a series of fexaramine analogs. Introduction of a CN substituent at the C-2 in the biphenyl ring of fexaramine increased maximum relative efficacy compared with fexaramine. Selectivity profiling of Example 4 using a panel of 18 nuclear receptors revealed that it is a highly selective FXR agonist. Introduction of a fluorine at the C-5 in the aniline ring in Example 4 further improved activity, thus, Example 11 showed 53±3% maximum efficacy relative to GW4064. Pharmacokinetic studies with Example 11 in Sprague-Dawley rats show that a substantial amount of Example 11 is absorbed in the intestine after oral administration, and then it is rapidly metabolized to inactive Example 24 by serum esterases after entering into the portal vein, indicating that it is an intestine-specific FXR agonist. Overall, the combined data from cell-based FXR agonist and antagonist assays and PK studies clearly showed that Example 11 is indeed an intestine-specific FXR partial agonist. Therefore, it will be interesting to examine in future clinical development whether Example 11 could limit potentially undesirable side effects such as pruritus and adverse effects on serum lipid profiles shown by all systemic FXR agonists entered in clinical trials to date.

What is claimed is:

1. A compound of the formula (I):

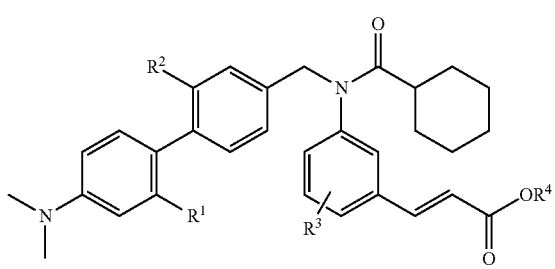

(I)

wherein: $R^1$ is H or F; $R^2$ is CN; $R^3$ is F; and $R^4$ is Me, Et, i-Pr, or cyclopropyl; or a pharmaceutically acceptable salt or a solvate thereof.

2. The compound of claim 1, which is selected from the group consisting of:

(E)-3-(3-((2-cyano-4'-dimethylaminobiphenyl-4-ylmethyl)cyclohexanecarbonylamino)-5-fluorophenyl) acrylic acid methyl ester;

(E)-3-(3-((2-cyano-4'-dimethylaminobiphenyl-4-ylmethyl)cyclohexanecarbonylamino)-5-fluorophenyl) acrylic acid ethyl ester; and (E)-3-(3-((2-cyano-4'-dimethylaminobiphenyl-4-ylmethyl)cyclohexanecarbonylamino)-2-fluorophenyl) acrylic acid isopropyl ester, or a pharmaceutically acceptable salt or a solvate thereof.

3. (E)-3-(3-((2-cyano-4'-dimethylaminobiphenyl-4-ylmethyl)cyclohexanecarbonylamino)-5-fluorophenyl)acrylic acid methyl ester, or a pharmaceutically acceptable salt or a solvate thereof.

4. A pharmaceutical composition comprising one or more compounds of claim 1, or a pharmaceutically acceptable salt or a solvate thereof, and a pharmaceutically acceptable diluent or carrier.

5. A method for treating, preventing, or reducing diseases states mediated by farnesoid X receptor (FXR), comprising administering to a human in need of said treatment, a therapeutically effective amount of the one or more compounds of claim 1, or a pharmaceutically acceptable salt or a solvate thereof.

6. A method for treating, preventing, or reducing a disease in human selected from the group consisting of primary biliary cirrhosis (PBC), primary sclerosing cholangitis (PSC), cholestasis, nonalcoholic steatohepatitis (NASH), nonalcoholic fatty liver disease (NAFLD), necrotizing enterocolitis, gastritis, ulcerative colitis, Crohn's disease, inflammatory bowel disease, irritable bowel syndrome, gastroenteritis, radiation-induced enteritis, pseudomembranous colitis, chemotherapy-induced enteritis, gastro-esophageal reflux disease (GERD), non-ulcer dyspepsia (NUD), celiac disease, intestinal celiac disease, post-surgical inflammation, gastric carcinogenesis, or any combination thereof.

\* \* \* \* \*